United States Patent
Kodama et al.

(10) Patent No.: US 10,525,414 B2
(45) Date of Patent: Jan. 7, 2020

(54) SPIRAL-WOUND ACID GAS SEPARATION MEMBRANE ELEMENT, ACID GAS SEPARATION MEMBRANE MODULE, AND ACID GAS SEPARATION APPARATUS

(71) Applicant: SUMITOMO CHEMICAL COMPANY, LIMITED, Tokyo (JP)

(72) Inventors: Nobutaka Kodama, Osaka (JP); Cui Liang, Osaka (JP); Hisaaki Miyamoto, Osaka (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 116 days.

(21) Appl. No.: 15/577,037

(22) PCT Filed: May 27, 2016

(86) PCT No.: PCT/JP2016/065775
§ 371 (c)(1),
(2) Date: Nov. 27, 2017

(87) PCT Pub. No.: WO2016/194832
PCT Pub. Date: Dec. 8, 2016

(65) Prior Publication Data
US 2018/0133654 A1 May 17, 2018

(30) Foreign Application Priority Data
May 29, 2015 (JP) .................................. 2015-110486

(51) Int. Cl.
*B01D 53/22* (2006.01)
*B01D 63/10* (2006.01)
(Continued)

(52) U.S. Cl.
CPC .............. *B01D 63/10* (2013.01); *B01D 53/22* (2013.01); *B01D 69/10* (2013.01); *B01D 69/12* (2013.01)

(58) Field of Classification Search
CPC .. B01D 69/142; B01D 2325/08; B01D 69/00; B01D 53/62; B01D 63/10; B01D 69/12;
(Continued)

(56) References Cited

U.S. PATENT DOCUMENTS

| | | |
|---|---|---|
| 5,034,126 A | 7/1991 | Reddy et al. |
| 5,096,584 A | 3/1992 | Reddy et al. |

(Continued)

FOREIGN PATENT DOCUMENTS

| | | |
|---|---|---|
| EP | 0 356 177 A1 | 2/1990 |
| EP | 2 865 438 A1 | 4/2015 |

(Continued)

OTHER PUBLICATIONS

Baker, R., "Future Directions of Membrane Gas Separation Technology", Ind. Eng. Chem. Res., 2002, vol. 41, No. 6, pp. 1393-1411 (19 pages).

(Continued)

*Primary Examiner* — Anthony R Shumate
(74) *Attorney, Agent, or Firm* — Sughrue Mion, PLLC

(57) ABSTRACT

A spiral-wound acid gas separation membrane element (1) includes a wound body including a separation membrane (2), a feed-side channel component (3), and a permeate-side channel component (4) wound in a laminated state around a core tube (5). The core tube (5) has a group of holes for allowing communication between a permeate-side spatial portion defined by the permeate-side channel component (4) and a spatial portion inside the core tube (5), the group of holes being present on an end side of the core tube (5).

6 Claims, 9 Drawing Sheets

(51) Int. Cl.
    *B01D 69/10* (2006.01)
    *B01D 69/12* (2006.01)
(58) Field of Classification Search
    CPC ...... B01D 69/10; B01D 53/228; B01D 63/00;
                    B01D 63/12; B01D 53/22
    See application file for complete search history.

(56) References Cited

U.S. PATENT DOCUMENTS

| | | | |
|---|---|---|---|
| 5,154,832 A | 10/1992 | Yamamura et al. | |
| 5,711,882 A | 1/1998 | Hofmann et al. | |
| 2005/0051642 A1* | 3/2005 | Negoro | B05B 1/3447 239/488 |
| 2008/0302719 A1* | 12/2008 | Chikura | B01D 63/10 210/497.1 |
| 2011/0184338 A1* | 7/2011 | McKay | A61M 25/003 604/28 |
| 2012/0318736 A1 | 12/2012 | Saito et al. | |
| 2013/0025834 A1* | 1/2013 | Choi | F28F 1/40 165/156 |
| 2015/0151244 A1 | 6/2015 | Ishizuka | |
| 2015/0157984 A1 | 6/2015 | Uda et al. | |
| 2015/0182917 A1 | 7/2015 | Hosoya et al. | |
| 2015/0283518 A1 | 10/2015 | Hirose et al. | |
| 2018/0133654 A1* | 5/2018 | Kodama | B01D 63/10 |

FOREIGN PATENT DOCUMENTS

| | | |
|---|---|---|
| JP | 1-115410 A | 5/1989 |
| JP | 2000-84371 A | 3/2000 |
| JP | 2010264421 A | 11/2010 |
| JP | 5443773 B2 | 3/2014 |
| JP | 2014-65034 A | 4/2014 |
| JP | 2014-79754 A | 5/2014 |
| JP | 201479745 A | 5/2014 |
| JP | 5598630 B1 | 10/2014 |
| JP | 2015027651 A | 2/2015 |

OTHER PUBLICATIONS

International Preliminary Report on Patentability and Translation of Written Opinion, dated Dec. 5, 2017 from the International Bureau in counterpart International application No. PCT/JP2016/065775.
International Search Report dated Jun. 28, 2016 from the International Bureau in counterpart International application No. PCT/JP2016/065775.
Communication dated Jan. 17, 2019 from European Patent Office in counterpart EP Application No. 16803267.0.
Communication dated Jun. 24, 2019, from the Intellectual Property Office of Taiwan in counterpart Application No. 105116598.
Communication dated Aug. 12, 2019, from the European Patent Office in counterpart European Application No. 16803267.0.

* cited by examiner

SPIRAL-WOUND ACID GAS SEPARATION MEMBRANE ELEMENT, ACID GAS SEPARATION MEMBRANE MODULE, AND ACID GAS SEPARATION APPARATUS

CROSS REFERENCE TO RELATED APPLICATIONS

This application is a National Stage of International Application No. PCT/JP2016/065775, filed May 27, 2016, claiming priority based on Japanese Patent Application No. 2015-110486, filed May 29, 2015, the contents of all of which are incorporated herein by reference in their entirety.

TECHNICAL FIELD

The present invention relates to a spiral-wound acid gas separation membrane element, an acid gas separation membrane module, and an acid gas separation apparatus each configured to separate acid gas from mixed gas including at least acid gas.

BACKGROUND ART

A gas membrane-separation process is a process of separating acid gas such as carbon dioxide ($CO_2$) from such mixed gas including at least acid gas as (i) synthesis gas synthesized in a large-scale plant that produces, for example, hydrogen and/or urea, (ii) natural gas, and (iii) exhaust gas. The gas membrane-separation process can save energy, and has attracted attention in recent years.

There have been proposed various gas separation membranes and membrane-separation apparatuses for use in the gas membrane-separation process. For example, Patent Literature 1 discloses a carbon dioxide separation apparatus, and Patent Literature 2 discloses a carbonic acid gas separation membrane.

A known example of an acid gas separation membrane element including a gas separation membrane is a spiral-wound acid gas separation membrane element. A spiral-wound acid gas separation membrane element includes (i) a wound body including a separation membrane, a feed-side channel component, and a permeate-side channel component that are wound in a laminated state around a core tube having a plurality of holes and (ii) a sealing section configured to prevent mixing of mixed gas (feed-side fluid) and permeation gas (permeate-side fluid).

Conventional spiral-wound acid gas separation membrane elements are structured such that (i) mixed gas flows in a direction crossed at substantially right angles by the direction in which permeation gas, which has permeated through a separation membrane, flows and that (ii) the core tube has, on a surface thereof, holes that are uniformly distributed so that the permeation gas can be collected into the core tube immediately. Further, conventional spiral-wound acid gas separation membrane elements are configured such that the core tube has a feed opening and a discharge opening both for a sweep fluid which serves to maintain the difference in partial pressure between acid gas in mixed gas and acid gas in permeation gas, which has permeated through a separation membrane, to improve the efficiency of separation by using the separation membrane.

CITATION LIST

Patent Literature

[Patent Literature 1] Japanese Patent Publication No. 5443773 (issued on Mar. 19, 2014)

[Patent Literature 2] Japanese Patent Publication No. 5598630 (issued on Oct. 1, 2014)

SUMMARY OF INVENTION

Technical Problem

A separation membrane that employs a facilitated transport mechanism for selective permeation of acid gas allows acid gas to permeate therethrough in an amount that varies according to the humidity: It allows acid gas to permeate therethrough in an amount that is larger at a higher humidity. In a process that uses a membrane to separate acid gas from mixed gas, however, conventional spiral-wound acid gas separation membrane elements undesirably cause water vapor in permeation gas, which has permeated through the separation membrane, to be immediately collected into the core tube together with acid gas, and thus have a low efficiency of acid gas separating by using the separation membrane.

Further, conventional spiral-wound acid gas separation membrane elements that feed water vapor to a permeate side of the membrane through the core tube as a sweep fluid require (i) a step of preparing a source for feeding water vapor having high thermal energy and (ii) a step of adjusting the pressure, the temperature, the flow rate, and/or the like of the water vapor. This makes it difficult to save energy in a gas membrane-separation process.

Conventional spiral-wound acid gas separation membrane elements, in other words, have room for improvement, and are required to be capable of saving energy and have an improved efficiency of acid gas separation by using the separation membrane.

The present invention has been accomplished in view of the above problems. It is a main object of the present invention to provide a spiral-wound acid gas separation membrane element, an acid gas separation membrane module, and an acid gas separation apparatus each of which can (i) separate, from mixed gas including at least acid gas and water vapor, the acid gas more efficiently than conventional and can also (ii) save energy.

Solution to Problem

In order to solve the above problem, the present invention may be in any of the following modes:

<1> A spiral-wound acid gas separation membrane element including: a wound body including: a separation membrane; a feed-side channel component; a permeate-side channel component; and a core tube, the separation membrane including: a separate functional layer including: an acid gas carrier that reversibly reacts with acid gas; and an acid gas separation membrane resin; and a support layer including a porous membrane, the separation membrane, the feed-side channel component, and the permeate-side channel component being wound in a laminated state around the core tube, the core tube having a group of holes for allowing communication between a permeate-side spatial portion defined by the permeate-side channel component and a spatial portion inside the core tube, the group of holes being present on an end side of the core tube.

<2> The spiral-wound acid gas separation membrane element according to <1>, wherein the group of holes are positioned not less than 0.05 W and not more than 0.4 W away from a widthwise end of the separation membrane in the laminated state which end is located on the end side, where W represents a width of the separation membrane in the laminated state.

<3> The spiral-wound acid gas separation membrane element according to <1> or <2>, further including: a partition in the permeate-side spatial portion which partition is configured to guide a flow of permeation gas, which has permeated through the separation membrane.

<4> The spiral-wound acid gas separation membrane element according to <3>, wherein the partition is made of an epoxy adhesive resin and is provided in a belt-like shape.

<5> An acid gas separation membrane module including: at least one spiral-wound acid gas separation membrane element according to any one of <1> to <4>; and a housing, the at least one spiral-wound acid gas separation membrane element being contained in the housing.

<6> The acid gas separation membrane module according to <5>, wherein: the acid gas separation membrane module includes two spiral-wound acid gas separation membrane elements in the housing; and the housing has three openings each for entry or exit of mixed gas.

<7> An acid gas separation apparatus including: at least one acid gas separation membrane module according to <5> or <6>.

<8> A method of using a spiral-wound acid gas separation membrane element according to any one of <1> to <4>, the spiral-wound acid gas separation membrane element being installed in a housing in such a manner that an end of the core tube on which end the group of holes are present is located on a downstream side of a path in which mixed gas flows through a spatial portion defined by the feed-side channel component.

Advantageous Effects of Invention

A spiral-wound acid gas separation membrane element, an acid gas separation membrane module, and an acid gas separation apparatus of the present invention can advantageously separate acid gas from mixed gas including at least acid gas and water vapor more efficiently than conventional, and can also save energy.

DESCRIPTION OF EMBODIMENTS

An embodiment of the present invention is described below in detail. For the present application, the expression "A to B" means not less than A and not more than B.

<Spiral-Wound Acid Gas Separation Membrane Element>

A spiral-wound acid gas separation membrane element according to the present invention includes: a wound body including: a separation membrane; a feed-side channel component; a permeate-side channel component; and a core tube, the separation membrane including: a separate functional layer including: an acid gas carrier that reversibly reacts with acid gas; and an acid gas separation membrane resin; and a support layer including a porous membrane, the separation membrane, the feed-side channel component, and the permeate-side channel component being wound in a laminated state around the core tube, the core tube having a group of holes for allowing communication between a permeate-side spatial portion defined by the permeate-side channel component and a spatial portion inside the core tube, the group of holes being present on an end side of the core tube.

For the present application, the term "acid gas" refers to a gas having acidity such as carbon dioxide and hydrogen sulfide. In the detailed description below, the acid gas is carbon dioxide ($CO_2$) as an example.

Figure 1:
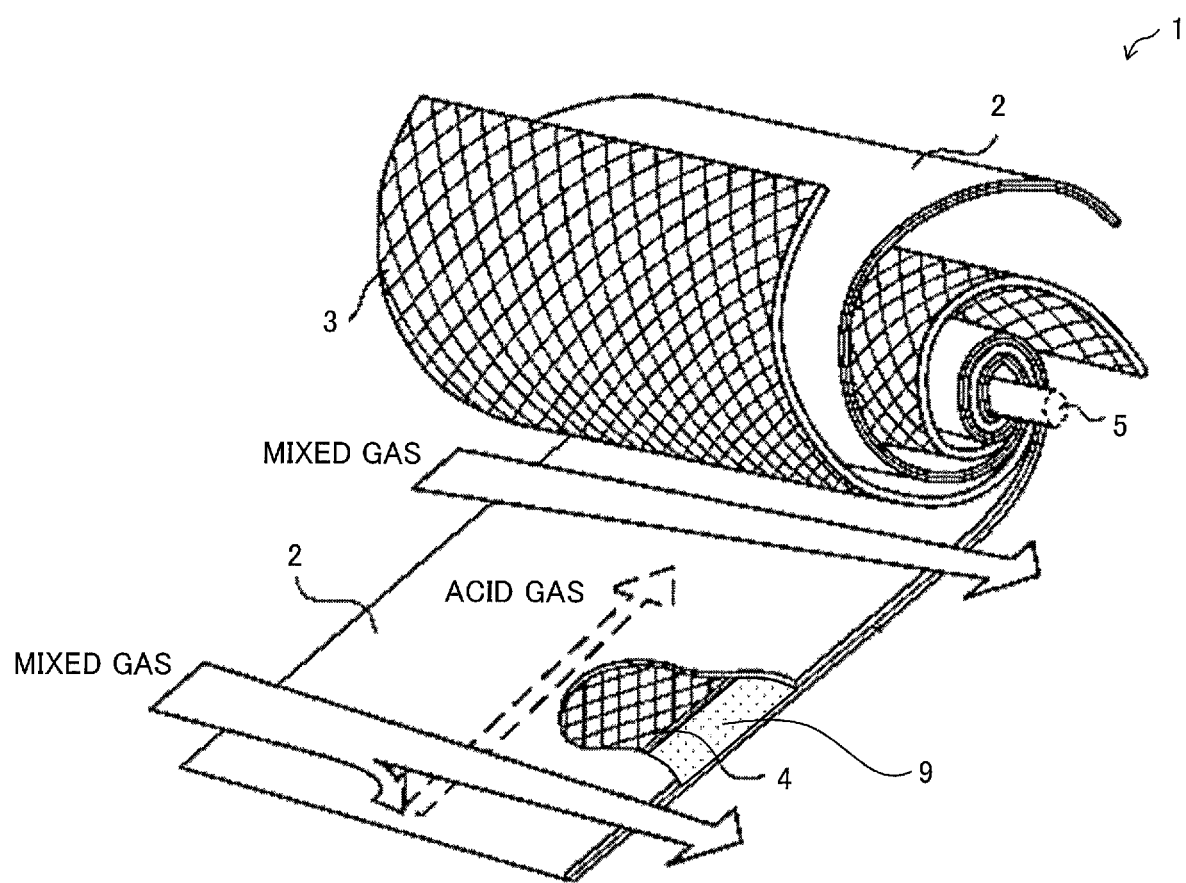
FIG. 1 is a perspective view of an acid gas separation membrane module according to the present invention, the view schematically illustrating a structure of a wound body included in the acid gas separation membrane module as developed and having a partial cutout portion (partial modification of FIG. 3 of academic paper; Ind. Eng. Chem. Res. 2002, 41, 1393-1411).
Figure 2:
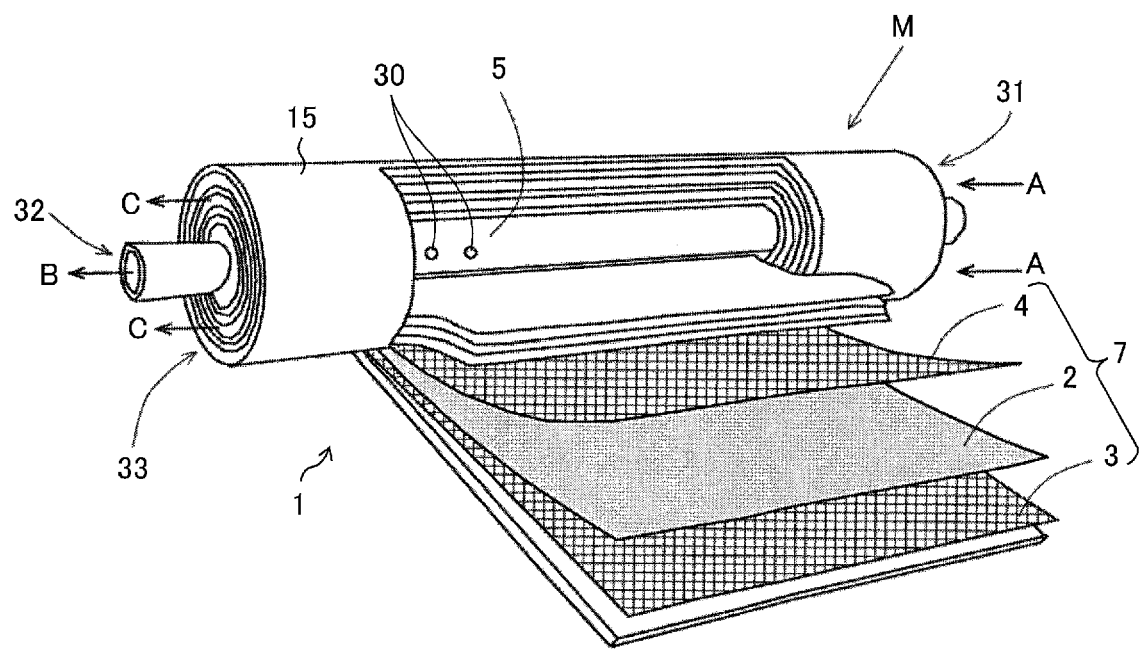
FIG. 2 is a perspective view of the acid gas separation membrane module, the view schematically illustrating a structure thereof as having a partially developed portion.

The description below deals with a configuration of a spiral-wound acid gas separation membrane element with reference to FIGS. 1 and 2. As illustrated in FIGS. 1 and 2, a spiral-wound acid gas separation membrane element 1 according to the present invention includes a wound body including (i) a separation membrane 2 including: a separate functional layer containing an acid gas carrier that reversibly reacts with acid gas and an acid gas separation membrane resin; and a support layer including a porous membrane, (ii) a feed-side channel component 3, (iii) a permeate-side channel component 4, and (iv) a core tube 5, around which the separation membrane 2, the feed-side channel component 3, and the permeate-side channel component 4 are wound in a laminated state.

The wound body may be in the shape of a cylindrical tube or an angular tube. The wound body is, however, preferably in the shape of a cylindrical tube to be contained in a housing.

The spiral-wound acid gas separation membrane element 1 further includes a fixing member such as a reinforcement tape and anti-telescoping devices (ATDs) to fix the wound body in order to prevent the wound body from unwinding. A reinforcement tape is wound around the wound body along its outer periphery to prevent the wound body from unwinding. Anti-telescoping devices are attached to the opposite ends of the wound body to prevent telescoping from occurring to the wound body during use of the spiral-wound acid gas separation membrane element. The spiral-wound acid gas separation membrane element 1 includes another reinforcement member wound around the wound body along its outer periphery to ensure strength against loads of an internal pressure and an external pressure both applied to the spiral-wound acid gas separation membrane element. The reinforcement member, for example, includes a glass fiber impregnated with epoxy resin. The epoxy resin is preferably cured after the reinforcement member is wound around the wound body.

[Separation Membrane 2]

The separation membrane 2 includes at least (i) a separate functional layer containing an acid gas carrier that reversibly reacts with acid gas and an acid gas separation membrane resin and (ii) a support layer including a porous membrane to support the separate functional layer.

The separation membrane 2 allows acid gas such as $CO_2$ and water vapor to permeate therethrough, but does not allow other gas to permeate therethrough easily. The separation membrane 2 has a solution-diffusion mechanism based on the difference between (i) the solubility of gas molecules in the membrane and (ii) the diffusivity of gas molecules in the membrane. The separation membrane 2 also has a facilitated transport mechanism for facilitating permeation of a particular acid gas by forming a reaction product of acid gas and an acid gas carrier that reversibly reacts with the acid gas. With use of these mechanisms, the separation membrane 2 highly selectively allows a particular acid gas to permeate therethrough. The separation membrane 2 allows acid gas to permeate therethrough in an amount that varies according to the humidity: It allows acid gas to permeate therethrough in an amount that is larger at a higher humidity.

(Acid Gas Separation Membrane Resin)

The Reaction Formula (1) below represents a reaction between $CO_2$ and a $CO_2$ carrier, in which case the acid gas is carbon dioxide ($CO_2$) and the acid gas carrier ($CO_2$ carrier) is cesium carbonate ($Cs_2CO_3$). The sign "<->" in the Reaction Formula (1) means that this reaction is a reversible reaction.

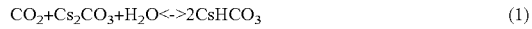

$$CO_2 + Cs_2CO_3 + H_2O \longleftrightarrow 2CsHCO_3 \quad (1)$$

As indicated in the Reaction Formula (1) above, the reversible reaction between $CO_2$ and the $CO_2$ carrier requires water. Thus, the separate functional layer preferably includes, as an acid gas separation membrane resin, a hydrophilic resin containing a hydrophilic group such as a hydroxyl group or an ion exchange group, more preferably a cross-linked hydrophilic resin in which molecular chains of the hydrophilic resin are cross-linked to one another to provide a network structure for a high water-holding capacity. Further, a large pressure is applied as a driving force for acid gas to permeate through the separation membrane 2. Thus, the separate functional layer preferably includes, as an acid gas separation membrane resin, a cross-linked hydrophilic resin to also ensure a pressure-withstanding strength required of the separation membrane 2.

The hydrophilic resin includes, for example, a polymer that preferably contains a structural unit derived from alkyl acrylate ester, alkyl methacrylate ester, vinyl ester of fatty acid, or a derivative of any of the above. Examples of such a hydrophilic polymer include a polymer produced by polymerizing a monomer such as acrylic acid, itaconic acid, crotonic acid, methacrylic acid, and vinyl acetate. Specific examples include (i) a polyacrylic acid, a polyitaconic acid, a polycrotonic acid, a polymethacrylic acid, and the like each of which contains a carboxyl group as an ion exchange group, (ii) a polyvinyl alcohol and the like each of which contains a hydroxyl group, and (iii) a copolymer of the above such as an acrylic acid-vinyl alcohol copolymer, an acrylic acid-methacrylic acid copolymer, an acrylic acid-methyl methacrylate copolymer, and a methacrylic acid-methyl methacrylate copolymer. More preferable among the above are (i) a polyacrylic acid, which is an acrylic acid polymer, (ii) a polymethacrylic acid, which is a methacrylic acid polymer, (iii) a polyvinyl alcohol, which is produced by hydrolyzing a vinyl acetate polymer, (iv) an acrylate-vinyl alcohol copolymer, which is produced by saponifying a copolymer of methyl acrylate and vinyl acetate, and (v) an acrylic acid-methacrylic acid copolymer, which is a copolymer of acrylic acid and methacrylic acid. Even more preferable among the above are a polyacrylic acid and an acrylate-vinyl alcohol copolymer.

The cross-linked hydrophilic resin may be prepared by reacting a hydrophilic polymer with a cross-linking agent or by copolymerizing a monomer as a raw material of a hydrophilic polymer with a cross-linkable monomer. The cross-linking agent and the cross-linkable monomer are not limited to any particular kinds, and can be conventionally publicly known cross-linking agent and cross-linkable monomer.

Examples of the cross-linking agent include conventionally publicly known cross-linking agents such as an epoxy cross-linking agent, a polyvalent glycidyl ether, a polyhydric alcohol, a polyvalent isocyanate, a polyvalent aziridine, a haloepoxy compound, a polyvalent aldehyde, a polyvalent amine, an organometallic cross-linking agent, and a metallic cross-linking agent. Examples of the cross-linkable monomer include conventionally publicly known cross-linkable monomers such as divinylbenzene, N,N'-methylenebisacrylamide, trimethylolpropane triallyl ether, and pentaerythritol tetraaryl ether. Example cross-linking methods include conventionally publicly known techniques such as thermal cross-linking, ultraviolet cross-linking, electron beam cross-linking, radiation cross-linking, and photo-cross-linking as well as methods disclosed in Japanese Patent Application Publication, Tokukai, No. 2003-268009 A and Japanese Patent Application Publication, *Tokukaihei*, No. 7-88171 A.

(Acid Gas Carrier)

The separate functional layer includes (i) an acid gas separation membrane resin (for example, a hydrophilic resin) and (ii) in the case where the acid gas is, for example, $CO_2$, at least one compound (hereinafter referred to as "$CO_2$ carrier") selected from the alkali metal compound group consisting of alkali metal carbonate, alkali metal bicarbonate, and alkali metal hydroxide. The $CO_2$ carrier is present in the separate functional layer, which includes the acid gas separation membrane resin, and reversibly reacts with $CO_2$ dissolved in water present in the separate functional layer to selectively allow the $CO_2$ to permeate through the separation membrane 2. The $CO_2$ carrier is preferably a carbonate, a bicarbonate, or a hydroxide of at least one alkali metal selected from the group consisting of Na, K, Rb, and Cs. Specifically, examples of the alkali metal carbonate include sodium carbonate, potassium carbonate, rubidium carbonate, and cesium carbonate; examples of the alkali metal bicarbonate include sodium bicarbonate, potassium bicarbonate, rubidium bicarbonate, and cesium bicarbonate; and examples of the alkali metal hydroxide include sodium hydroxide, potassium hydroxide, rubidium hydroxide, and cesium hydroxide. The $CO_2$ carrier is preferably an alkali metal carbonate or an alkali metal hydroxide each having deliquescence, more preferably cesium carbonate or cesium hydroxide, each of which is highly soluble in water.

The separate functional layer contains, in addition to alkali metal cations derived from the $CO_2$ carrier, various alkali metal cations such as alkali metal cations used in a neutralization reaction of an ion exchange group (for example, a carboxyl group) in the hydrophilic resin. All of these alkali metal cations are contained in the separate functional layer in an amount preferably within the range of 1 molar equivalent to 6 molar equivalents, more preferably within the range of 1.5 molar equivalents to 5 molar equivalents, with respect to the total amount of the ion exchange group in the hydrophilic resin. If the alkali metal cations are contained in an amount of less than 1 molar equivalent, the separation membrane 2 may not be easily in the form of a membrane. If the alkali metal cations are contained in an amount of more than 6 molar equivalents, the separate functional layer may not achieve desired $CO_2$ selective permeation.

(Additive)

The separate functional layer of the separation membrane 2 is formed with use of a coating solution (described later) that, in addition to (i) an acid gas carrier that reversibly reacts with acid gas and (ii) an acid gas separation membrane resin both to be included in the separate functional layer, may further contain, for example, a hydration reaction catalyst for acid gas and/or a later-described surface active agent as an additive. The hydration reaction catalyst for acid gas increases the rate of reaction between the acid gas and the carrier.

The hydration reaction catalyst for acid gas is preferably a catalyst containing an oxo acid compound, particularly a catalyst containing an oxo acid compound of at least one element selected from the group 14 elements, the group 15 elements, and the group 16 elements, more preferably a catalyst containing at least one of a tellurous acid compound, a selenious acid compound, an arsenious acid compound, and an orthosilicic acid compound.

(Support Layer)

The separation membrane 2 includes, on the side of the permeate-side channel component 4, a support layer including a porous membrane that does not serve as resistance against diffusion of a gas component having permeated through the membrane and that has high gas permeability. The support layer is preferably a hydrophobic porous membrane. The separate functional layer, which contains an acid gas carrier that reversibly reacts with acid gas and an acid gas separation membrane resin, is placed on a surface of the support layer, which includes a porous membrane, to form a separation membrane 2. This configuration can prevent water in the separate functional layer from entering the pores of the support layer, and can thus prevent a decrease in the membrane capability of the separation membrane 2.

The separation membrane 2 is intended for use in a process of producing, for example, hydrogen and/or urea in a large-scale plant, in which process the separation membrane 2 is used at a temperature of not lower than 100° C. The members of the separation membrane 2 such as the porous membrane thus each preferably have a heat resistance of not lower than 100° C. For the present application, the term "hydrophobicity" refers to the state of water having a contact angle of not less than 90° at 25° C. For the present application, the expression "heat resistance of not lower than 100° C." refers to the following property of a member such as the porous membrane: Even after the member has been stored at a temperature of not lower than 100° C. for 2 hours, the form of the member before the storage is maintained, and there occurs no visually recognizable curl caused by thermal contraction or thermal melting.

The porous membrane included in the support layer is made of a material such as (i) a polyolefin resin such as polyethylene and polypropylene, (ii) a fluorine-containing resin such as polytetrafluoroethylene (PTFE), polyvinyl fluoride, and polyvinylidene fluoride, (iii) a resin material such as polyphenylene sulfide (PPS), polyether sulfone, polyether ether ketone (PEEK), polyimide, high-molecular-weight polyester, heat-resistant polyamide, aramid, and polycarbonate, and (iv) an inorganic material such as metal, glass, and ceramics. Preferable among the above are a fluorine-containing resin such as PTFE, polyvinyl fluoride, and polyvinylidene fluoride, PPS, polyether sulfone, PEEK, polyimide, and ceramics for water repellency and heat resistance. More preferable among the above is PTFE for such reasons as follows: (i) PTFE allows minute pores to be easily formed. (ii) PTFE can have a high porosity, and thus achieves a high energy efficiency for separation.

The porous membrane may have any thickness. Typically, the thickness falls preferably within the range of 10 μm to 3000 μm, more preferably within the range of 10 μm to 500 μm, even more preferably within the range of 15 μm to 150 μm, for a greater mechanical strength. The pores of the porous membrane may have any average pore size. The average pore size is preferably not more than 10 μm, more preferably within the range of 0.005 μm to 1.0 μm. The porous membrane has a porosity preferably within the range of 5% to 99%, more preferably within the range of 30% to 90%.

The support layer may further include a reinforcement porous membrane. The reinforcement porous membrane is preferably placed on a surface opposite to the surface at which the porous membrane is in contact with the separate functional layer. The reinforcement porous membrane serves to impart to the separation membrane 2 a strength to withstand, for example, (i) a tensile load applied to the support layer during the production of the separation membrane 2, (ii) a tensile load applied to the separation membrane 2 during the production of a spiral-wound acid gas separation membrane element including the separation membrane 2, and (iii) a pressure load applied to the separation membrane 2 when acid gas is separated from mixed gas. The reinforcement porous membrane may have any structure and be made of any material that allow the separation membrane 2 to have a pressure-withstanding strength, an anti-drawing property, and good gas permeability. The reinforcement porous membrane may be selected for use as appropriate from among nonwoven fabric, woven fabric, net, and the like each having an average pore size of not less than 0.001 μm and not more than 10 μm. The reinforcement porous membrane is preferably made of, among the above, a heat-resistant material as with (i) the separate functional layer, which contains an acid gas carrier that reversibly reacts with acid gas, and an acid gas separation membrane resin and (ii) the porous membrane.

(Method for Producing Separation Membrane 2)

The description below deals with a method for producing the separation membrane 2. The production of the separation membrane 2 involves three steps: a first step (coating solution preparing step), a second step (applying step), and a third step (drying step). The second step and the third step each preferably use roll-to-roll coater and dryer, which carry out the second step and the third step while continuously transferring the support layer. The three steps are described below in detail.

First, in the first step (coating solution preparing step), at least an acid gas separation membrane resin and a $CO_2$ carrier are dissolved in a medium to prepare a coating solution.

Examples of the medium include (i) a protic polar medium such as water and an alcohol such as methanol, ethanol, 1-propanol, and 2-propanol, (ii) a nonpolar medium such as toluene, xylene, and hexane, and (iii) an aprotic polar medium such as a ketone such as acetone, methyl ethyl ketone, and methyl isobutyl ketone, N-methylpyrrolidone, N,N-dimethylacetamide, and N,N-dimethylformamide. The first step may use a single kind of medium alone, or two or more kinds in combination that are mixed uniformly with one another. Preferable among the above is a medium containing at least one selected from the group consisting of water and an alcohol such as methanol, ethanol, 1-propanol, and 2-propanol. More preferable among the above is a medium containing water.

The coating solution may contain a surface active agent as necessary. Adding a surface active agent to the coating solution achieves the following advantage: In a case where the coating solution is applied to the support layer including the porous membrane, the surface active agent is unevenly present at the interface between a separate functional layer formed of the coating solution and the support layer to (i) increase affinity for the hydrophobic support layer and (ii) alleviate problems such as uneven thickness of the membrane. The surface active agent is not limited to any particular kind. Examples of the surface active agent include conventionally publicly known surface active agents such as a polyoxyethylene polyoxypropylene glycol, a polyoxyethylene alkyl phenyl ether, a polyoxyethylene alkyl ether, a fluorine-based surface active agent, and a silicone-based surface active agent. The coating solution may contain a single kind of surface active agent alone, or two or more kinds in combination.

Next, in the second step (applying step), the coating solution prepared is applied to a surface of the support layer to form a coating. During the second step, the coating solution may have a temperature set as appropriate depending on the composition and/or concentration of the coating solution. An excessively high temperature may, however, cause the medium to evaporate from the coating solution in a large amount, possibly changing the composition and/or concentration and/or leaving a mark of evaporation in the coating. The temperature is thus preferably not lower than 15° C., more preferably not lower than room temperature (20° C.), and preferably falls within the temperature range of not higher than 5° C. lower than the boiling point of the medium in use. In a case where the medium is water, for example, the coating solution during the second step has a temperature preferably within the temperature range of 15° C. to 95° C.

The coating solution may be applied to the support layer by any method. Examples of the method include spin coating, bar coating, die coating, blade coating, air-knife coating, gravure coating, roll coating, spray coating, dip coating, Comma roll method, kiss coater method, screen printing, and inkjet printing. The coating solution is applied in a weight per unit area (solid content per unit area) preferably within the range of 1 g/m$^2$ to 1000 g/m$^2$, more preferably within the range of 5 g/m$^2$ to 750 g/m$^2$, even more preferably within the range of 10 g/m$^2$ to 500 g/m$^2$. The weight per unit area can be adjusted (controlled) on the basis of, for example, the speed of forming the coating (for example, the speed of transferring the support layer), the concentration of the coating solution, and/or the discharge amount of the coating solution. The coating solution may be applied to the support layer in a stripe pattern or a dot pattern.

Then, in the third step (drying step), the medium is removed from the coating formed. The medium may be removed by any method, and can be removed by a conventionally publicly known method. The medium is, however, preferably removed by a method of drying the coating by subjecting the coating to, for example, flowing heated air to cause the medium to evaporate for removal. A specific example is a method of causing the medium to evaporate from the coating for removal by putting the applied product (that is, the support layer on which a coating has been formed) into an air blowing drying furnace adjusted to have a predetermined temperature and a predetermined humidity. This forms a separate functional layer.

The coating may be dried at a temperature set as appropriate depending on (i) the medium for the coating solution and (ii) the kind of porous membrane included in the support layer. Typically, the drying temperature is preferably higher than the freezing point of the medium and lower than the melting point of the porous membrane. Normally, a suitable drying temperature falls within the range of 80° C. to 200° C.

The third step is performed until the concentration of the medium in the coating falls below a predetermined value. Specifically, the third step is preferably performed until the amount of the medium in the separate functional layer falls within the range of 1 weight % to 34 weight %.

The separate functional layer has a thickness selected as appropriate depending on the separation capability necessary for the separation membrane 2. Typically, however, the thickness falls preferably within the range of 0.1 μm to 600 μm, more preferably within the range of 0.5 μm to 400 μm, particularly preferably within the range of 1 μm to 200 μm.

Alternatively, the second step and the third step may be repeated at least once on an exposed surface of the formed separate functional layer to form a laminate of separate functional layers. This can prevent formation of a pinhole in the separate functional layer which pinhole may be caused by, for example, unevenness of the coating formed by the application of the coating solution. In the case where the second step and the third step are repeated, the individual separate functional layers may be formed either under different coating conditions (such as the composition of the coating solution and the amount of the coating solution applied) and drying conditions or under identical coating conditions and drying conditions.

Performing the first step, the second step, and the third step described above produces a separation membrane 2 to be included in the spiral-wound acid gas separation membrane element 1.

[Feed-Side Channel Component 3]

The feed-side channel component 3 preferably has (i) a function as a channel component that defines a channel space for mixed gas (hereinafter referred to also as "feed-side spatial portion") and (ii) a function of generating a turbulent flow in the mixed gas. The feed-side channel component 3 is thus suitably a net-shaped channel component. Different mesh shapes define different channels for mixed gas. The feed-side channel component 3 may thus have a mesh with a unit lattice in a shape (for example, a rhombus or a parallelogram) selected in correspondence with the desired channel space for mixed gas. The feed-side channel component 3 may be made of any material. However, since the separation membrane 2 is used at a temperature of not lower than 100° C., the material is preferably heat-resistant, and can suitably be, for example, a material similar to any material cited as an example material for the porous membrane. Specifically, the material is preferably PTFE, PPS, polyether sulfone, PEEK, polyimide, or metal, more preferably PTFE, PPS, PEEK, or metal.

The feed-side channel component 3 defines a channel space for guiding mixed gas into the wound body. Mixed gas is thus fed into the wound body continuously in a direction toward a side surface of the feed-side channel component 3.

The feed-side channel component 3 may be separated from the separation membrane 2 in the wound body by a porous membrane for protection as a protective layer. The protective layer serves to prevent the separate functional layer of the separation membrane 2 from being damaged due to a misplacement between the separate functional layer and the feed-side channel component 3 when the wound body is compressed during the production of the spiral-wound acid gas separation membrane element 1. The porous membrane for protection may be made of any material that causes only small friction with the feed-side channel component 3 and that has good gas permeability. However, since the separation membrane 2 is used at a temperature of not lower than 100° C., the material is preferably heat-resistant, and can suitably be, for example, a material similar to any material cited as an example material for the porous membrane included in the support layer of the separation membrane 2. Alternatively, the porous membrane for protection may be selected for use as appropriate from among nonwoven fabric, woven fabric, net, and the like each having an average pore size of not less than 0.001 μm and not more than 10 μm. The protective layer may be structured from a laminate of porous membranes of one or more kinds.

[Permeate-Side Channel Component 4]

The permeate-side channel component 4 preferably has (i) a function as a channel component that defines a channel space for permeation gas (hereinafter referred to also as "permeate-side spatial portion") having permeated through the separation membrane 2 and containing acid gas and water vapor and (ii) a function of generating a turbulent flow in the permeation gas. The permeate-side channel component 4 is thus suitably a net-shaped channel component. Different mesh shapes define different channels for permeation gas. The permeate-side channel component 4 may thus have a mesh with a unit lattice in a shape (for example, a rhombus or a parallelogram) selected in correspondence with the desired channel space for permeation gas. The permeate-side channel component 4 may be made of any material. However, since the separation membrane 2 is used at a temperature of not lower than 100° C., the material is preferably heat-resistant, and can suitably be, for example, a material similar to any material cited as an example material for the porous membrane. Specifically, the material is preferably PTFE, PPS, polyether sulfone, PEEK, polyimide, or metal, more preferably PTFE, PPS, PEEK, or metal.

The permeate-side channel component 4 defines a permeate-side spatial portion for guiding permeation gas, which has permeated through the separation membrane 2, into the core tube 5.

The feed-side channel component 3 and the permeate-side channel component 4 each preferably have (i) a function of facilitating a turbulent flow (front surface renewal of a membrane surface) of mixed gas fed or permeation gas, which has permeated through the separation membrane 2, to increase the speed of membrane permeation of acid gas included in the mixed gas and (ii) a function of minimizing a pressure drop in the mixed gas fed.

(Separation Membrane Laminate)

The wound body is configured such that mixed gas fed is not mixed with permeation gas, which has permeated through the separation membrane 2 and which contains acid gas and water vapor. Specifically, the wound body includes a membrane leaf (separation membrane laminate) structured such that a long rectangular separation membrane 2 is folded into two parts with the separate functional layer inside and with a long rectangular feed-side channel component 3 sandwiched between the two parts. The membrane leaf has a size of, for example, approximately 0.5 m to 1.5 m×0.5 m to 1.5 m. The membrane leaf is, in other words, structured such that a feed-side channel component 3 is sandwiched by a single separation membrane 2. The membrane leaf may be formed with, instead of a single separation membrane 2 folded in half, two long rectangular separation membranes 2 with their respective separate functional layers inside and with a long rectangular feed-side channel component 3 sandwiched between the two separation membranes 2. In this case, an end of one of the two separation membranes 2 is bonded to an end of the other separation membrane 2 so that the two separation membranes 2 appear as if to be a single separation membrane 2.

The membrane leaf is bonded to the permeate-side channel component 4 with use of an adhesive to provide a laminate 7. The separation membrane 2 thus separates the permeate-side spatial portion, defined by the permeate-side channel component 4, from the feed-side spatial portion, defined by the feed-side channel component 3.

The adhesive may be made of any material that allows the membrane leaf, specifically the separation membrane 2, to be bonded to the permeate-side channel component 4. However, since the separation membrane 2 is used at a temperature of not lower than 100° C., the material is preferably both heat-resistant and moisture-resistant. Examples of the adhesive include an epoxy resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, a polyvinyl butyral, a polyester, a cellulose derivative (for example, nitrocellulose), a styrene-butadiene copolymer, various synthetic rubber resins, a phenol resin, a urea resin, a melamine resin, a phenoxy resin, a silicone resin, and a urea formamide resin. Preferable among the above are an epoxy resin (epoxy adhesive resin) and a silicone resin. More preferable among the above is an epoxy resin. The adhesive may further contain an inorganic or organic filler to, for example, adjust the viscosity during use and/or increase the strength after the curing. The epoxy resin may be any compound containing an epoxy group curable with use of, for example, an amine or an acid anhydride. In terms of how it is cured, the epoxy resin may be cured alone, or may be mixed with another material to be cured. In terms of the curing temperature, the epoxy resin may be cured upon heating, or may be cured at a normal temperature.

When applied to, for example, the separation membrane 2, the adhesive has a viscosity preferably within the range of 5,000 cP to 50,000 cP, more preferably within the range of 20,000 cP to 50,000 cP, to prevent the adhesive from spreading for a larger adhesion section 9 and a smaller effective area for the separation membrane 2. The separation membrane 2 and the permeate-side channel component 4 are bonded to each other not necessarily with use of an adhesive.

FIGS. 3(a) to 3(f) are each a plan view schematically illustrating a shape of a partition(s) that may be provided in a permeate-side spatial portion defined by the separation membrane 2 and the permeate-side channel component 4, both included in the wound body. As illustrated in FIG. 3, the laminate 7 may as necessary contain, in the permeate-side spatial portion, at least one belt-like partition 10 for guiding a flow of permeation gas (indicated by broken lines in FIG. 3). Specifically, the laminate 7 may contain, in the permeate-side spatial portion, at least one belt-like partition 10 for defining a channel for permeation gas in, for example, a C shape ((a) of FIG. 3), a comb shape (1) ((b) of FIG. 3), an S shape ((c) of FIG. 3), a comb shape (2) ((d) of FIG. 3), or an N shape ((e) of FIG. 3).

Providing the partition 10 achieves the following advantage: With the partition 10, water vapor in permeation gas, which has permeated through the separation membrane 2, is not collected into the core tube 5 immediately at that part of the permeate-side spatial portion which corresponds to an upstream side of the feed-side spatial portion (lower side of each of (a) to (f) of FIG. 3), but is guided to that part of the permeate-side spatial portion which corresponds to a downstream side of the feed-side spatial portion (upper side of each of (a) to (f) of FIG. 3). This can reduce a low-humidity region in the feed-side spatial portion and the permeate-side spatial portion. The above configuration thus allows mixed gas and permeation gas, which has permeated through the separation membrane 2, to both retain moisture, and maintains a high efficiency for acid gas separation.

Figure 3:
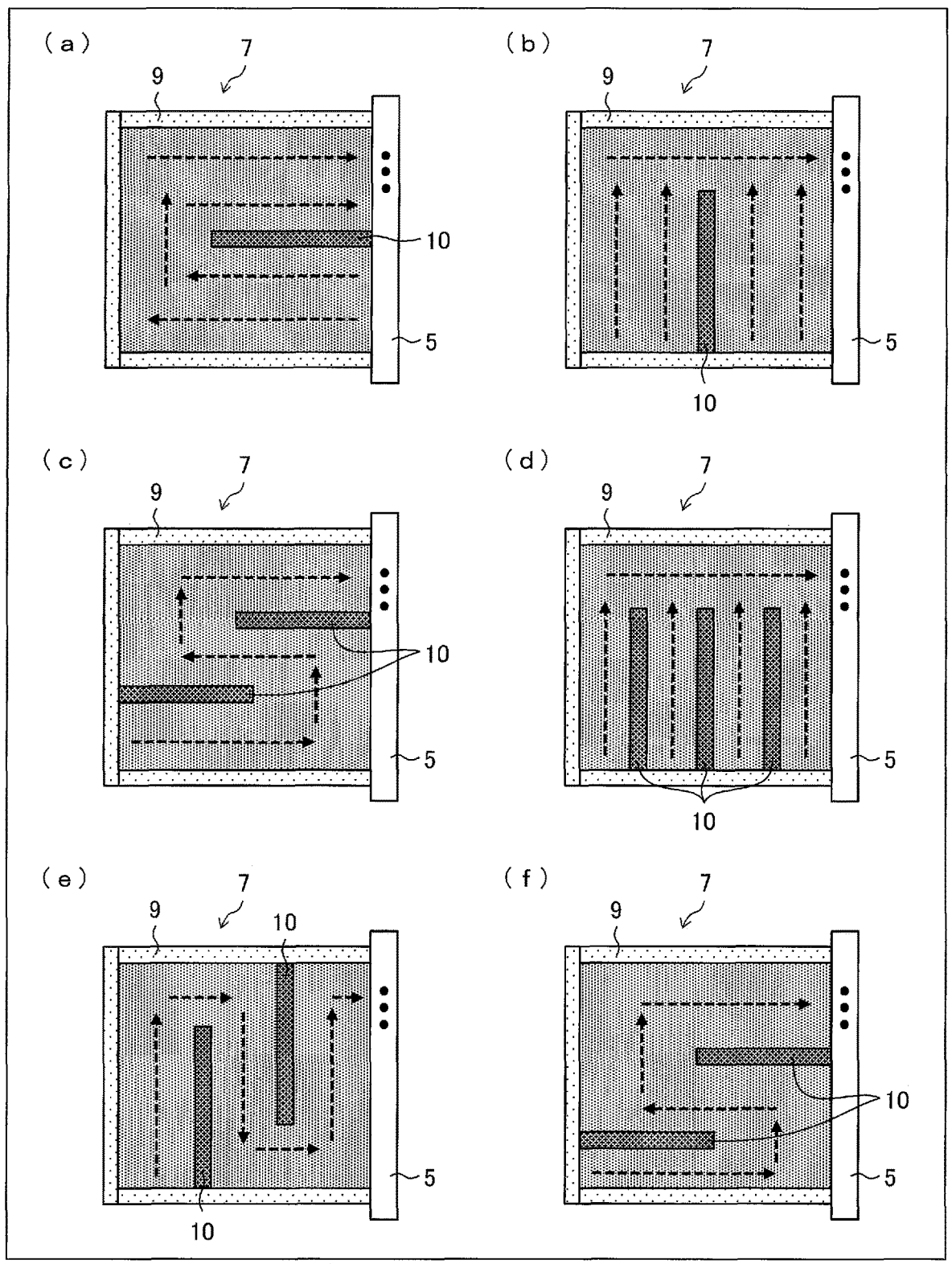
FIGS. 3(a) to 3(f) are each a plan view schematically illustrating a shape of a partition(s) that may be provided in a permeate-side spatial portion defined by the separation membrane and the permeate-side channel component, both included in the wound body.

The laminate 7 may alternatively contain partitions 10 to define a channel for permeation gas in an S shape ((f) of FIG. 3) which channel is narrow on the upstream side and wide on the downstream side. This allows permeation gas flowing through the permeate-side spatial portion to have a substantially uniform volume flow rate (linear velocity) per unit sectional area over the entire space.

The laminate 7 may contain any number of partitions 10. The laminate 7, however, preferably contains only a few partitions 10, more preferably one or two partitions 10, for a more efficient use of the separation membrane 2. The partition 10 may have any width. The width is, however, preferably small for a more efficient use of the separation membrane 2. The partition 10 may have any length. The partition 10 is, however, preferably long enough to (i) not define a channel through which permeation gas is undesirably collected into the core tube 5 immediately and thereby (ii) prevent water vapor in permeation gas, which has permeated through the separation membrane 2, from being collected into the core tube 5 before reaching that part of the permeate-side spatial portion which corresponds to the downstream side of the feed-side spatial portion. The partition 10 is thus preferably a belt-like member. The partition 10 may be oriented (have a length) in the permeate-side spatial portion to extend parallel with the core tube 5 or orthogonal to the core tube 5. The partition 10 may be formed by any method. The partition 10 is, however, preferably formed with use of the adhesive used to bond the separation membrane 2 and the permeate-side channel component 4 to each other. This allows the partition 10 to be formed efficiently when the separation membrane 2 and the permeate-side channel component 4 are bonded to each other. The partition 10 is thus preferably formed as a belt-like member with use of an epoxy adhesive resin.

[Core Tube 5]

The core tube 5 is a duct for collecting permeation gas, which has permeated through the separation membrane 2, and discharging the permeation gas from the spiral-wound acid gas separation membrane element 1. The core tube 5 may be made of any material. However, since the separation membrane 2 is used at a temperature of not lower than 100° C., the material is preferably heat-resistant. Further, since members such as the separation membrane 2 are wound around the core tube 5 along its outer periphery a plurality of times to provide a wound body, the material preferably has a high mechanical strength. A suitable material for the core tube 5 is, for example, stainless steel. The core tube 5 may have a diameter, a length, and a wall thickness that are selected as appropriate depending on, for example, the size of the spiral-wound acid gas separation membrane element 1, the number of membrane leaves, the amount of permeation gas, and/or a mechanical strength required of the core tube 5.

The core tube 5 is preferably (i) a circular duct in a case where the wound body is a cylindrical tube and (ii) an angular duct in a case where the wound body is an angular tube.

The core tube 5 has a group of holes for allowing communication between (i) the permeate-side spatial portion, defined by the permeate-side channel component 4, and (ii) a spatial portion inside the core tube 5. The holes may each have a size selected in view of a mechanical strength required of the core tube 5. In a case where the individual holes cannot be large, the core tube 5 may simply have a larger number of holes.

The group of holes are present on one end side of the core tube 5. Specifically, the group of holes are present on an end side corresponding to the downstream side of the path in which mixed gas flows through the feed-side spatial portion of the spiral-wound acid gas separation membrane element 1. More specifically, the group of holes in the core tube 5 are so present as to be positioned preferably not less than 0.05 W (=0.05×W) and not more than 0.4 W (=0.4×W), more preferably not less than 0.05 W (=0.05×W) and not more than 0.3 W (=0.3×W), away from a widthwise end of the separation membrane 2 in the laminated state which end is located on the end side, where W is the width of the separation membrane 2 in the above laminated state (that is, the length parallel with the flow path of mixed gas).

The group of holes on the core tube 5, which are present within the above range, collect permeation gas. This configuration calls for a longer time period for water vapor present in the spatial portion defined by the permeate-side channel component 4 to be collected into the core tube 5 than a configuration in which a group of holes are distributed all over the core tube 5. The above configuration thus allows mixed gas and permeation gas to both retain moisture, and maintains a high efficiency for acid gas separation.

<Acid Gas Separation Membrane Module>

FIG. 1 is a perspective view of an acid gas separation membrane module according to the present invention, the view schematically illustrating a structure of a wound body included in the acid gas separation membrane module as developed and having a partial cutout portion. FIG. 2 is a perspective view of the acid gas separation membrane module, the view schematically illustrating a structure thereof as having a partially developed portion. An acid gas separation membrane module according to the present invention includes, in a housing (container) 15, at least one spiral-wound acid gas separation membrane element 1 illustrated in FIGS. 1 and 2.

As illustrated in FIG. 2, the acid gas separation membrane module M includes, in a housing 15 made of a material such as stainless steel, at least one spiral-wound acid gas separation membrane element 1 including a wound body that includes a laminate 7 of a separation membrane 2, a feed-side channel component 3, and a permeate-side channel component 4 which laminate 7 is wound around a core tube 5 having a plurality of holes (group of holes) 30.

Figure 4:
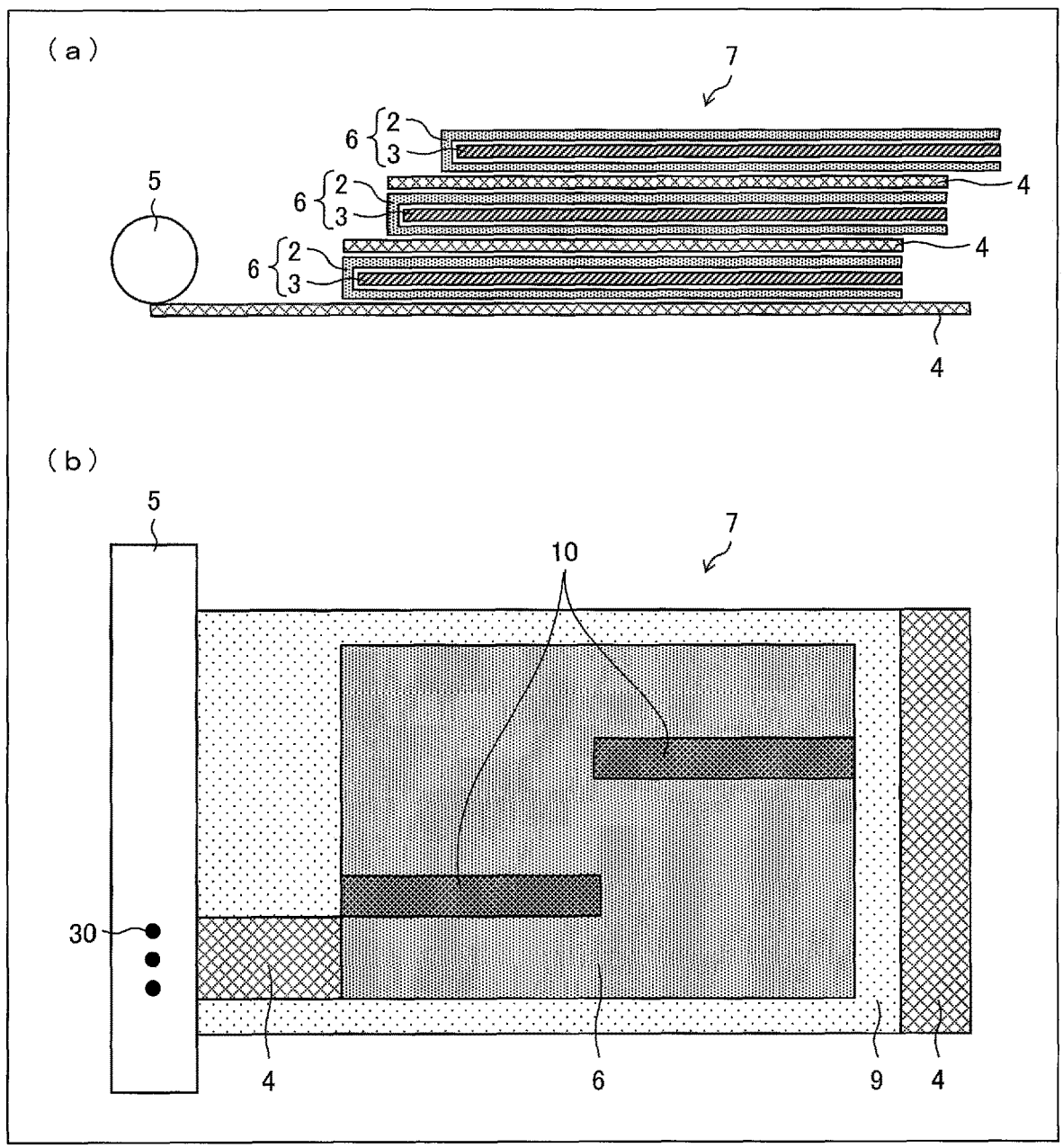
FIG. 4 illustrates a structure as developed of the wound body, where (a) is a cross-sectional view schematically illustrating the structure, and (b) is a plan view schematically illustrating the structure.

With reference to FIG. 4, the description below deals with a method (production process) for producing a spiral-wound acid gas separation membrane element 1 according to the present invention and a method for producing an acid gas separation membrane module M according to the present invention.

FIG. 4 illustrates a structure as developed of a wound body included in an acid gas separation membrane module according to the present invention, where (a) is a cross-sectional view schematically illustrating the structure, and (b) is a plan view schematically illustrating the structure.

First, a lengthwise end of a long permeate-side channel component 4 is bonded to the outer wall of the core tube 5 with use of, for example, an adhesive.

Further, a plurality of membrane leaves 6 are prepared in each of which a long separation membrane 2 is folded into two parts with a separate functional layer inside and with a long feed-side channel component 3 between the two parts.

Next, a membrane leaf 6 is placed on the permeate-side channel component 4 bonded to the outer wall of the core tube 5. For this placement, the crease of the membrane leaf 6 folded in half is located on the side of the core tube 5. Further, the crease is apart from the lengthwise end (which is bonded to the outer wall of the core tube 5) of the permeate-side channel component 4 so that only the permeate-side channel component 4 will be wound around the core tube 5 later. The membrane leaf 6 is, in other words, placed in such a manner that the permeate-side channel component 4 will have a region near the core tube 5 in which region no membrane leaf 6 is placed. An adhesive may preferably be applied to that region of the permeate-side channel component 4 which is near the core tube 5 and in which no membrane leaf 6 is placed, except for a portion that defines the permeate-side spatial portion communicating with the holes 30 of the core tube 5.

Next, an adhesive is applied to an exposed surface of the membrane leaf 6 (that is, the surface opposite to the permeate-side channel component 4). Specifically, an adhesive is applied in a belt-like pattern along the opposite widthwise ends of the membrane leaf 6 (that is, the ends parallel with the core tube 5) and a lengthwise end (on the side far from the core tube 5) of the membrane leaf 6 (that is, an end orthogonal to the core tube 5). Further, an adhesive is also applied as necessary to a belt-like region in which a partition(s) 10 is to be formed. Subsequently, a further permeate-side channel component 4 and another membrane leaf 6 are placed on the exposed surface in this order to be attached thereto. This forms an adhesion section 9, which in turn causes a permeate-side spatial portion to be defined by the permeate-side channel component 4 and forms a partition(s) 10. For this formation, the further permeate-side channel component 4 and the other membrane leaf 6 are equal in area to or smaller in area than the immediately previously placed permeate-side channel component 4 and membrane leaf 6. The further permeate-side channel component 4 preferably has a lengthwise end on the side of the core tube 5 which lengthwise end is aligned with that lengthwise end of the immediately previously placed membrane leaf 6 which is on the side of the core tube 5. The other membrane leaf 6 is apart from the core tube 5 farther than the immediately previously placed permeate-side channel component 4 so that only the permeate-side channel component 4 will be wound around the core tube 5.

Then, an adhesive is applied to an exposed surface of the other membrane leaf 6. A further permeate-side channel component 4 and another membrane leaf 6 are similarly placed on the exposed surface in this order to be attached thereto. The adhesive is applied to a position on the exposed surface of the other membrane leaf 6 which position may either coincide or partially not coincide with the position on the exposed surface of the immediately previously placed membrane leaf 6 to which position the adhesive was applied. A membrane leaf 6 and other members are placed on top repeatedly as described above for attachment of a predetermined number of sets of a membrane leaf 6 and other members to form a laminate 7.

Next, an adhesive is applied to an exposed surface of the membrane leaf 6 placed last. Specifically, an adhesive is applied in a belt-like pattern along the opposite widthwise ends of the membrane leaf 6 and a lengthwise end (on the side far from the core tube 5) of the membrane leaf 6. Further, an adhesive is also applied as necessary to a belt-like region in which a partition(s) 10 is to be formed. Then, the laminate 7 is wound around the core tube 5 in such a manner as to cover the holes 30 of the core tube 5, and the permeate-side spatial portions, defined by the respective permeate-side channel components 4, are closed with use of the outer wall of the core tube 5. This forms a wound body. The laminate 7 is preferably wound around the core tube 5 under tension.

Next, a reinforcement tape is wound around the wound body along its outer periphery to fix the wound body and prevent the wound body from unwinding. Further, anti-telescoping devices are attached to the opposite ends of the wound body to prevent telescoping from occurring to the wound body during use of the spiral-wound acid gas separation membrane element. In addition, a reinforcement member is further wound around the wound body along its outer periphery. This produces a spiral-wound acid gas separation membrane element 1.

Then, at least one spiral-wound acid gas separation membrane element 1 produced as above is placed inside a housing 15, and an opening for entry or exit of mixed gas and an exit opening for permeation gas are attached to the housing 15. This produces an acid gas separation membrane module M.

<Method of Using Spiral-Wound Acid Gas Separation Membrane Element>

To use a spiral-wound acid gas separation membrane element 1 according to the present invention, the spiral-wound acid gas separation membrane element 1 is installed in a housing 15 in such a manner that the end of the core tube 5 at which end the plurality of holes 30 (group of holes) are present is located on the downstream side of the path in which mixed gas flows through the feed-side spatial portion, which is defined by the feed-side channel component 3. This configures an acid gas separation membrane module M. The description below deals with a method of using an acid gas separation membrane module M configured as above and a spiral-wound acid gas separation membrane element.

(Acid Gas Separation Method)

Mixed gas including at least acid gas and water vapor is continuously fed into the acid gas separation membrane module M through a feed opening 31 (indicated by the arrows A in FIG. 2) corresponding to that part of the feed-side spatial portion defined by each feed-side channel component 3 which corresponds to the upstream side of the acid gas separation membrane module M. Permeation gas, which has permeated through each separation membrane 2, passes through the permeate-side spatial portion defined by the permeate-side channel component 4, and is continuously collected through the holes 30 and a discharge opening (opening section) 32 of the core tube 5 (indicated by the arrow B in FIG. 2). The remaining mixed gas is continuously discharged through a discharge opening 33 (indicated by the arrows C in FIG. 2) corresponding to that part of the feed-side spatial portion defined by each feed-side channel component 3 which corresponds to the downstream side of the acid gas separation membrane module M. This configuration makes it possible to separate acid gas from mixed gas including at least acid gas and water vapor more efficiently than conventional.

The acid gas separation membrane module M may include any number of spiral-wound acid gas separation membrane elements 1 arranged in any manner depending on the desired recovery ratio of acid gas (=((flow rate of acid gas in permeation gas)/(flow rate of acid gas in mixed gas))×100). For example, acid gas separation membrane modules each including a single spiral-wound acid gas separation membrane element 1 in a housing 15 may be (i) prepared in a number that achieves the desired rate of acid gas collection and (ii) arranged in parallel or in series. Expressions such as "arranged in parallel" refers to a configuration in which at least mixed gas is (i) distributed among a plurality of acid gas separation membrane modules M and (ii) introduced thereinto through the feed opening of each feed-side spatial portion. Expressions such as "arranged in series" refers to a configuration in which at least mixed gas or permeation gas discharged from the discharge opening of the preceding acid gas separation membrane module M is introduced into the subsequent acid gas separation membrane module through the feed opening of the feed-side spatial portion.

In a case where, for example, a plurality of spiral-wound acid gas separation membrane elements 1 are arranged in parallel, a plurality of acid gas separation membrane modules M each including two spiral-wound acid gas separation membrane elements 1 in a housing 15 are preferably arranged in parallel for an increased efficiency of containing spiral-wound acid gas separation membrane elements 1. In this case, each housing 15 preferably has three openings each for entry or exit of mixed gas (in addition to at least one exit opening for permeation gas). Specifically, it is preferable that (i) two spiral-wound acid gas separation membrane elements 1 are so contained in each housing 15 as to appear to be arranged in series, that (ii) mixed gas is fed into the two spiral-wound acid gas separation membrane elements 1 in parallel, and that (iii) mixed gas that did not permeate through the separation membranes 2 is discharged. More specifically, in a case where acid gas separation membrane modules M are configured as above, it is preferable that (i) mixed gas is fed through one (entry opening) of the three openings each for entry or exit, whereas mixed gas that did not permeate through the separation membranes 2 is taken out through the other two openings (exit openings) or that (ii) mixed gas is fed through two (entry openings) of the three openings each for entry or exit, whereas mixed gas that did not permeate through the separation membranes 2 is taken out through the other opening (exit opening).

<Acid Gas Separation Apparatus>

An acid gas separation apparatus according to the present invention includes at least one acid gas separation membrane module M configured as above. The acid gas separation apparatus, which includes the acid gas separation membrane module M, can separate acid gas from mixed gas including at least acid gas and water vapor more efficiently than conventional, and can also save energy.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Further, combining technical means disclosed in different embodiments can provide a new technical feature.

EXAMPLES

The description below deals in greater detail with the present invention on the basis of Examples. The present invention is, however, not limited by these Examples.

(Gas Leakage Test of Spiral-Wound Acid Gas Separation Membrane Element 1)

Figure 5:
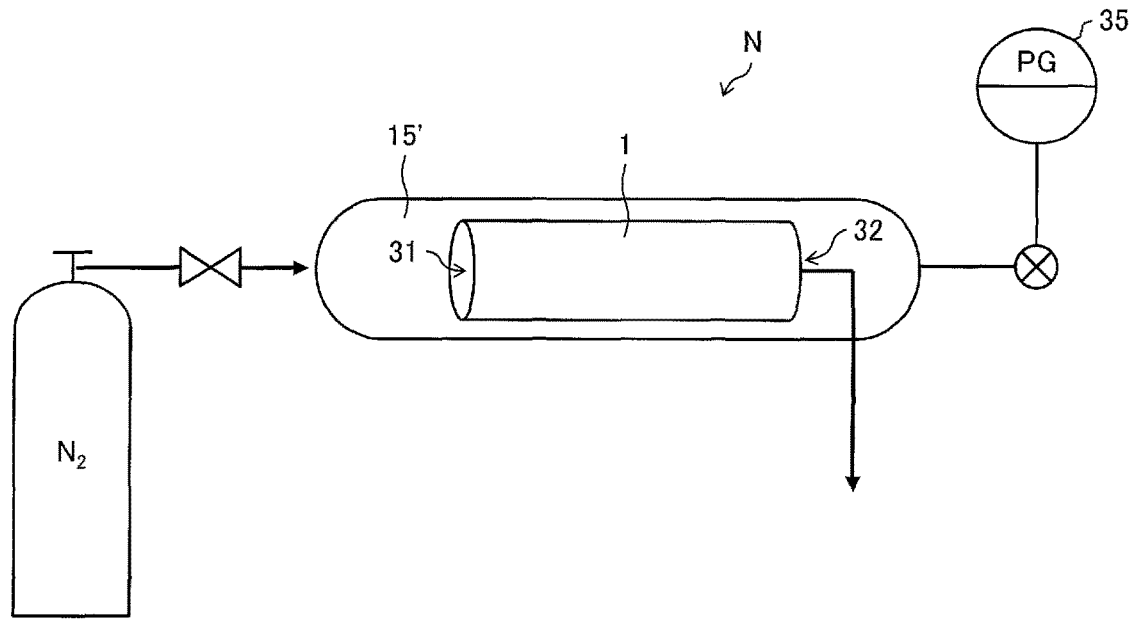
FIG. 5 is a schematic diagram of a testing device for conducting a gas leakage test of a spiral-wound acid gas separation membrane element included in the acid gas separation membrane module.

A spiral-wound acid gas separation membrane element 1 was fixed inside a stainless-steel housing 15' of a testing device N in such a manner that as illustrated in FIG. 5, the side of the feed opening 31 of the feed-side spatial portion and the side of the discharge opening 32 of the core tube in the spiral-wound acid gas separation membrane element 1 were separated from each other by a separation membrane of the spiral-wound acid gas separation membrane element 1. The core tube extended to the outside of the housing 15' on the side of the discharge opening 32 and was closed on the opposite side. The spiral-wound acid gas separation membrane element 1 had the side of the feed opening 31 of the feed-side spatial portion and the opposite side (discharge opening sides) inside the housing 15'. In other words, gas fed into the housing 15' was flown through both ends of the feed-side spatial portion (feed opening side and discharge opening side) of the spiral-wound acid gas separation membrane element 1 into the spiral-wound acid gas separation membrane element 1.

Further, a cylinder for feeding nitrogen ($N_2$) gas into the housing 15' was attached to the housing 15' with a valve in-between, and a manometer 35 for measuring the pressure inside the housing 15' was also attached to the housing 15'.

$N_2$ gas having room temperature (20° C.) was fed into the housing 15', and a pressure of 1500 kPaG (where G represents a gage pressure) was applied to the spiral-wound acid gas separation membrane element 1 on the side of the feed opening 31 and on the opposite side. The pressure was checked with use of the manometer 35. The pressure on the side of the discharge opening 32 of the core tube was adjusted to atmospheric pressure.

After that, a change over time in the pressure inside the housing 15' was measured with use of the manometer 35 while the above state was kept. A gas leakage test of the spiral-wound acid gas separation membrane element 1 was thus performed to evaluate the $N_2$ gas permeation capability of the spiral-wound acid gas separation membrane element 1. Specifically, the permeance of $N_2$ ($mol/m^2 \cdot s \cdot kPa$) was calculated from the change over time in the pressure measured, and if the permeance was not more than $5 \times 10^{-8}$ $mol/m^2 \cdot s \cdot kPa$, the spiral-wound acid gas separation membrane element 1 passed the test, that is, the spiral-wound acid gas separation membrane element 1 was evaluated as keeping gas tightness.

(Measurement of Amount of $CO_2$ Separated by Spiral-Wound Acid Gas Separation Membrane Element 1)

Figure 6:
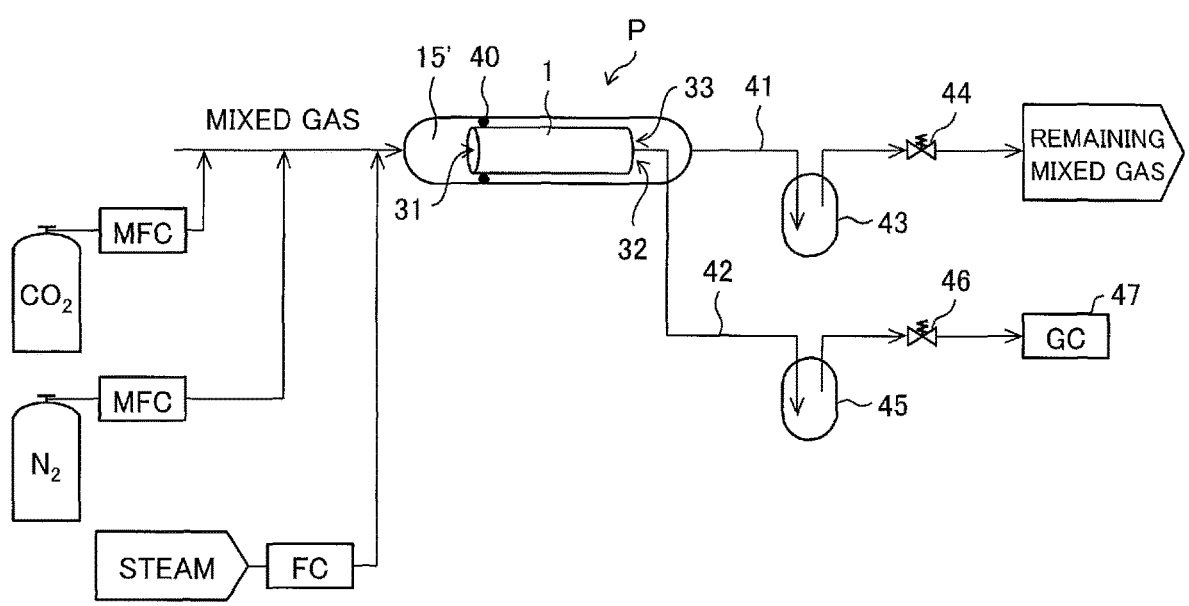
FIG. 6 is a schematic diagram of a measuring device for measuring the amount of $CO_2$ separation by a spiral-wound acid gas separation membrane element included in the acid gas separation membrane module.

The spiral-wound acid gas separation membrane element 1 was fixed inside a stainless-steel housing 15' of a measuring device P in such a manner that as illustrated in FIG. 6, the side of the feed opening 31 of the feed-side spatial portion and the side of the discharge opening 33 of the feed-side spatial portion of the spiral-wound acid gas separation membrane element 1 were separated from each other. The spiral-wound acid gas separation membrane element 1 was installed in the housing 15' in such a manner that the end of the core tube on which end the group of holes were present was located on the side of the discharge opening 33. The housing 15' contained a sealing member 40 so attached thereto as to separate the side of the feed opening 31 and the side of the discharge opening 33 of the feed-side spatial portion. The core tube extended to the outside of the housing 15' on the side of the discharge opening 32 and was closed on the opposite side.

A cylinder for feeding nitrogen ($N_2$) gas, a cylinder for feeding carbonic acid gas ($CO_2$), and a pipe for feeding water vapor (steam) were each attached to the housing 15' with a valve and a flowmeter in-between so that mixed gas could be fed to the side of the feed opening 31 of the feed-side spatial portion of the spiral-wound acid gas separation membrane element 1 in the housing 15'. A pipe 41 was attached to the side of the discharge opening 33 of the spiral-wound acid gas separation membrane element 1 in the housing 15'. A gas-liquid separator 43 and a back pressure governor 44 were connected to the pipe 41 in this order. Further, the core tube extended to the outside of the housing 15' on the side of the discharge opening 32, and a pipe 42 was attached to the side of the discharge opening 32. A gas-liquid separator 45 and a back pressure governor 46 were connected to the pipe 42 in this order. The pipe 41 had an open end. The pipe 42 had an end connected to a gas chromatograph 47. In FIG. 6, "MFC" represents a mass flow controller, and "FC" represents a flow controller. These controllers are each a device for adjusting a flow rate.

{Case where No Partition was Formed in Spatial Portion Defined by Permeate-Side Channel Component}

The amount of $CO_2$ separated by the spiral-wound acid gas separation membrane element 1 for a case where no partition was formed in a spatial portion defined by the permeate-side channel component was measured with use of the above-configured measuring device P under the conditions below.

First, the temperature inside the housing 15' was adjusted to 110° C. Next, mixed gas (humidity: 80% RH) including 62 mol % of $CO_2$, 15 mol % of $N_2$, and 23 mol % of $H_2O$ and having a temperature adjusted to 110° C. was fed into the housing 15' continuously in a feed amount of 0.1 $Nm^3/hr$. The mixed gas had a pressure (that is, the pressure after the steam was condensed and removed with use of the gas-liquid separator 43) adjusted to 500 kPaA (where A indicates an absolute pressure) with use of the back pressure governor 44 connected to the pipe 41 attached to the side of the discharge opening 33 communicating through a spatial portion defined by the feed-side channel component. Further, permeation gas, which had permeated through the separation membrane, had a pressure (that is, the pressure after the steam was condensed and removed with use of the gas-liquid separator 45) adjusted to 101 kPaA (atmospheric pressure) with use of the back pressure governor 46 connected to the pipe 42 attached to the core tube on the side of the discharge opening 32.

Then, the flow rate of the permeation gas was measured with use of a flowmeter (not shown in FIG. 6) installed downstream of the back pressure governor 46, and the concentration of $CO_2$ in the permeation gas was measured with use of the gas chromatograph 47. The flow rate of $CO_2$ in the permeation gas was calculated from the measurement results obtained. The value calculated was regarded as indicative of the amount of $CO_2$ separated by the spiral-wound acid gas separation membrane element 1 (unit: kg-$CO_2$/hr/spiral-wound acid gas separation membrane element).

{Case where Partition(s) was Formed in Spatial Portion Defined by Permeate-Side Channel Component}

The amount of $CO_2$ separated by the spiral-wound acid gas separation membrane element 1 for a case where a partition(s) was formed in a spatial portion defined by the permeate-side channel component was measured with use of the above-configured measuring device P under the conditions below.

First, the temperature inside the housing 15' was adjusted to 118° C. Next, mixed gas (humidity: 85% RH) including 52 mol % of $CO_2$, 22 mol % of $N_2$, and 26 mol % of $H_2O$ and having a temperature adjusted to 118° C. was fed into the housing 15' continuously in a feed amount of 0.1 $Nm^3/hr$. The mixed gas had a pressure (that is, the pressure after the steam was condensed and removed with use of the gas-liquid separator 43) adjusted to 500 kPaA (where A indicates an absolute pressure) with use of the back pressure governor 44 connected to the pipe 41 attached to the side of the discharge opening 33 communicating through a spatial portion defined by the feed-side channel component. Further, permeation gas, which had permeated through the separation membrane, had a pressure (that is, the pressure after the steam was condensed and removed with use of the gas-liquid separator 45) adjusted to 160 kPaA with use of the back pressure governor 46 connected to the pipe 42 attached to the core tube on the side of the discharge opening 32.

Then, the flow rate of the permeation gas was measured with use of a flowmeter (not shown in FIG. 6) installed downstream of the back pressure governor 46, and the concentration of $CO_2$ in the permeation gas was measured with use of the gas chromatograph 47. The flow rate of $CO_2$ in the permeation gas was calculated from the measurement results obtained. The value calculated was regarded as indicative of the amount of $CO_2$ separated by the spiral-wound acid gas separation membrane element 1 (unit: kg-$CO_2$/hr/spiral-wound acid gas separation membrane element).

[Example 1] Spiral-Wound Acid Gas Separation Membrane Element with No Partition

A Cs salt type of an acrylic acid-vinyl alcohol copolymer (copolymer of $CH_2$=CH(COOH) and $CH_2$=CH(OH); the term "Cs salt type" refers to a salt in which the "COOH" above is "COOCs") was used as a polymer of which the separate functional layer of a separation membrane was made. Further, cesium carbonate ($Cs_2CO_3$) was used as an acid gas carrier.

A hydrophobic PTFE porous membrane (produced by Sumitomo Electric Fine Polymer, Inc.; product name: poreflon HP-010-50, thickness: 50 μm, pore size: 0.1 μm) was used as a support layer for the separation membrane. Further, a PPS nonwoven fabric (produced by Hirose Paper Mfg. Co., Ltd.; product name: PS0080) as a porous membrane for reinforcement was attached to a surface of the hydrophobic PTFE porous membrane which surface was opposite to a surface on which a separate functional layer was to be formed.

A separate functional layer was prepared as follows: First, 3 g of a Cs salt type of an acrylic acid-vinyl alcohol copolymer which Cs salt type was produced by a method disclosed in Japanese Patent No. 5598630 and 7 g of cesium carbonate were added to 80 g of water, and the water was stirred to be mixed. This prepared a coating solution (first step). The amount ratio of the cesium carbonate to the copolymer was 2.3 (g-cesium carbonate/g-copolymer). The coating solution was applied to the hydrophobic PTFE porous membrane to form a coating (second step). The coating solution was applied in such an amount that the weight per unit area was 100 g/m².

The hydrophobic PTFE porous membrane, on which the coating had been formed, was semi-dried at a temperature of 60° C. for not shorter than 5 minutes. This prepared a separate functional layer. Then, a PPS nonwoven fabric (produced by Hirose Paper Mfg. Co., Ltd.; product name: PS0080) was placed on an exposed surface of the separate functional layer as a protective layer. Next, the hydrophobic PTFE porous membrane was further dried at a temperature of approximately 120° C. for not shorter than 3 minutes. This prepared a separation membrane (third step).

The separation membrane was then used to prepare a spiral-wound acid gas separation membrane element.

A PPS net (50×50 mesh) (produced by Dio Chemicals, Ltd.; product name: 50-150PPS) was used as a feed-side channel component. Three PPS net layers (50×50 mesh/60× 40 mesh/50×50 mesh) (produced by Dio Chemicals, Ltd.; product name: 50-150PPS and 60(40)-150PPS) were used as a permeate-side channel component. A two-liquid-mixture type epoxy adhesive (viscosity: 45,000 cP) was used as an adhesive for forming an adhesion section for a membrane leaf. The separation membrane was folded into two parts with the separate functional layer inside and the feed-side channel component between the two parts, and was bonded with use of the adhesive. This prepared a membrane leaf.

Figure 7:
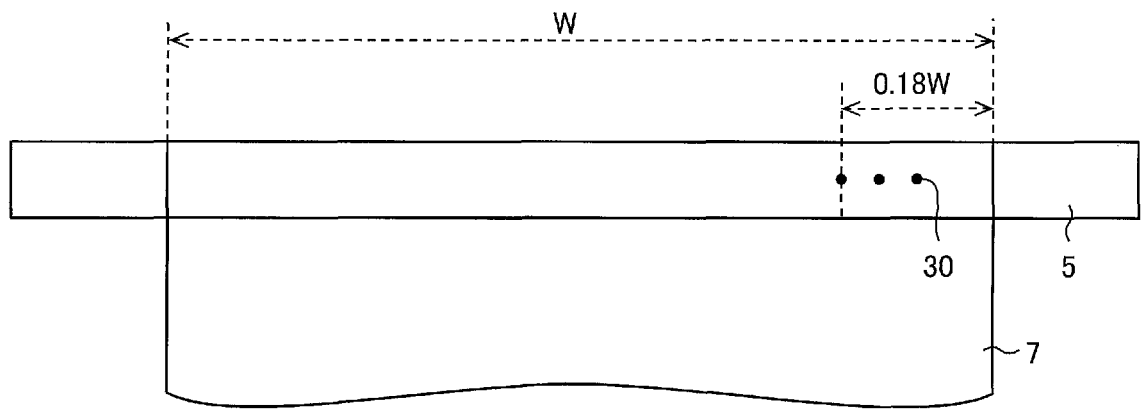
FIG. 7 is an elevational view schematically illustrating a core tube in a spiral-wound acid gas separation membrane element of Example 1.

A tube made of stainless steel and having an outer diameter of 1 inch was used as a core tube. As illustrated in FIG. 7, six holes 30 were formed on the core tube 5 in such a manner as to be present on the side of the end of the core tube 5 which end was located on the downstream side of the path in which mixed gas would flow through a feed-side spatial portion defined by the feed-side channel component (right side in FIG. 7). Specifically, three holes 30 were formed on the outer wall of the core tube 5 symmetrically on either side of the central axis of the core tube 5 (FIG. 7 shows only three holes; the other three holes were present in the outer wall on the opposite side across the central axis).

The holes 30 each had a diameter of 3 mm. Holes 30 adjacent to one another in a row were arranged at an interval of 12.7 mm. The six holes 30 were formed in such a manner that each hole 30 farthest from the side of the above end (right side in FIG. 7) had its center at a position separated by 0.18 W from the end of the laminate 7 which end was located on the side of the above end, where W represents the width of the separation membrane in the laminated state, that is, the width of the laminate 7 (341 mm).

A spiral-wound acid gas separation membrane element was produced by the above-described method for producing a spiral-wound acid gas separation membrane element (production process) (see the description above). The permeate-side channel component was bonded to the core tube with use of a two-liquid-mixture type epoxy adhesive (viscosity: 45,000 cP). A glass fiber impregnated with a two-liquid-mixture type epoxy adhesive (viscosity: 5,000 cP) was used as a reinforcement member for the outer periphery of the spiral-wound acid gas separation membrane element.

The spiral-wound acid gas separation membrane element produced had a diameter of 4 inches (102 mm) and a length of 15 inches (381 mm). The above-described gas leakage test was conducted on the spiral-wound acid gas separation membrane element produced, and confirmed that the spiral-wound acid gas separation membrane element was gas tight.

The amount of $CO_2$ separated by the spiral-wound acid gas separation membrane element was measured, and was compared with the amount of $CO_2$ separated by the spiral-wound acid gas separation membrane element of Comparative Example 1 below. The flow rate of mixed gas was set at 4.5 Nm³/hr·m². The comparison showed that with the index of 100 for the amount of $CO_2$ separated by the spiral-wound acid gas separation membrane element of Comparative Example 1, the amount of $CO_2$ separated by the above-produced spiral-wound acid gas separation membrane element was 105. This demonstrated that the efficiency of $CO_2$ separation is increased by forming a group of holes on the core tube in such a manner that the holes are present on the side of the end of the core tube which end is located on the downstream side of the channel in which mixed gas flows through the feed-side spatial portion defined by the feed-side channel component. Table 1 comprehensively shows the structure of the group of holes on the core tube and the amount of separated $CO_2$, for the spiral-wound acid gas separation membrane element of Example 1.

Comparative Example 1

Figure 8:
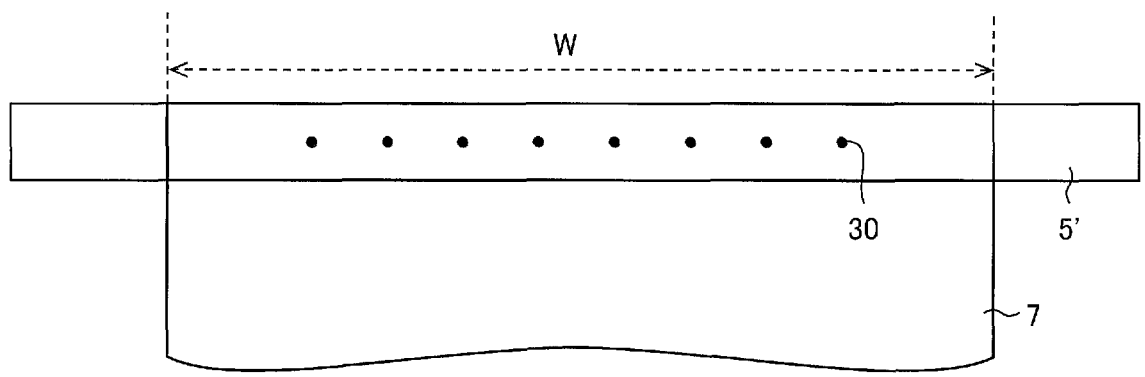
FIG. 8 is an elevational view schematically illustrating a core tube in a spiral-wound acid gas separation membrane element of Comparative Example 1.

A spiral-wound acid gas separation membrane element was produced as in Example 1 except that the core tube 5 (see FIG. 7) was replaced with a core tube 5' that was made of stainless steel, that had an outer diameter of 1 inch, and that had twenty holes 30 at a uniform interval over the entire width of the separation membrane in the laminated state, that is, over the entire widthwise range of the laminate 7. More specifically, a core tube 5' was used that had two rows of holes 30 each of which rows had ten holes 30 arranged at a uniform interval over the entire widthwise range of the laminate 7 (FIG. 8 schematically shows the holes arranged in one of the two rows; the holes arranged in the other row were present in the outer wall on the opposite side across the central axis of the core tube 5'). The holes 30 each had a diameter of 3 mm. Holes 30 adjacent to one another in a row were arranged at an interval of 25.4 mm. With the flow rate of mixed gas set at 4.5 Nm³/hr·m², the amount of $CO_2$ separated by the spiral-wound acid gas separation membrane element was measured. Table 1 comprehensively shows the structure of the group of holes on the core tube and the amount of separated $CO_2$, for the spiral-wound acid gas separation membrane element of Comparative Example 1.

Example 2

The amount of $CO_2$ separated by the spiral-wound acid gas separation membrane element produced in Example 1 was measured with the flow rate of mixed gas changed to 0.3 Nm³/hr·m², and was compared with the amount of $CO_2$ separated by the spiral-wound acid gas separation membrane element of Comparative Example 2 below. The comparison showed that with the index of 100 for the amount of $CO_2$ separated by the spiral-wound acid gas separation membrane element of Comparative Example 2, the amount of $CO_2$ separated by the above-produced spiral-wound acid gas separation membrane element was 131. This demonstrated that the efficiency of $CO_2$ separation is increased by forming a group of holes on the core tube in such a manner that the holes are present on the side of the end of the core tube which end is located on the downstream side of the path in which mixed gas flows through the feed-side spatial portion defined by the feed-side channel component. Table 2 comprehensively shows the structure of the group of holes on the core tube and the amount of separated $CO_2$, for the spiral-wound acid gas separation membrane element of Example 2.

Comparative Example 2

The amount of $CO_2$ separated by the spiral-wound acid gas separation membrane element produced in Comparative Example 1 was measured with the flow rate of mixed gas changed to 0.3 $Nm^3/hr \cdot m^2$. Table 2 comprehensively shows the structure of the group of holes on the core tube and the amount of separated $CO_2$, for the spiral-wound acid gas separation membrane element of Comparative Example 2.

Example 3

A membrane leaf was prepared as in Example 1 except that a PPS net (50×50 mesh) (produced by Dio Chemicals, Ltd.; product name: 50-150PPS) was used as a feed-side channel component. Two PPS net layers (60×40 mesh/60× 40 mesh) (produced by Dio Chemicals, Ltd.; product name: 63-60(40)-150PPS) were used as a permeate-side channel component.

Figure 9:
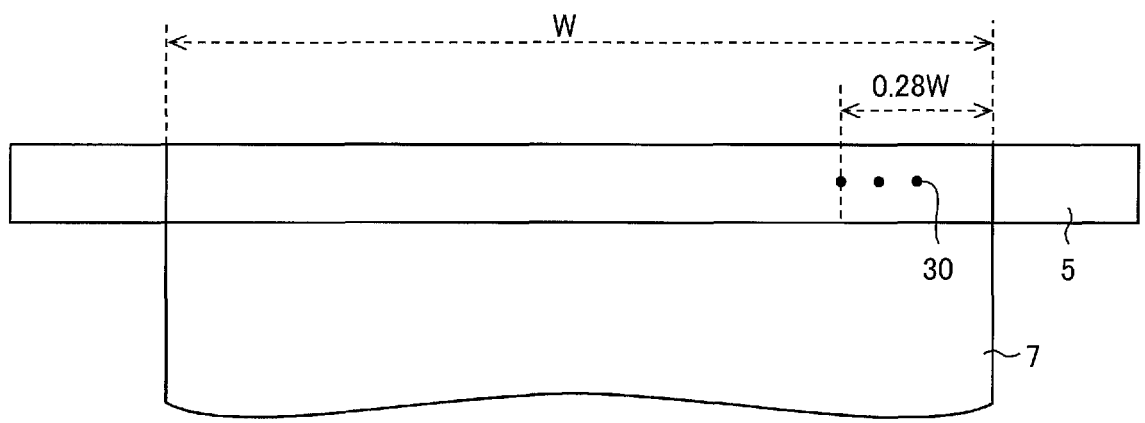
FIG. 9 is an elevational view schematically illustrating a core tube in a spiral-wound acid gas separation membrane element of Example 3.

A tube made of stainless steel and having an outer diameter of 1 inch was used as a core tube. As illustrated in FIG. 9, six holes 30 were formed on the core tube 5 in such a manner as to be present on the side of the end of the core tube 5 which end was located on the downstream side of the path in which mixed gas would flow through a spatial portion defined by the feed-side channel component (right side in FIG. 9). Specifically, three holes 30 were formed on the outer wall of the core tube 5 symmetrically on either side of the central axis of the core tube 5 (FIG. 9 shows only three holes; the other three holes were present in the outer wall on the opposite side across the central axis).

The holes 30 each had a diameter of 3 mm. The holes 30 adjacent to one another in a row were arranged at an interval of 12.7 mm. The six holes 30 were formed in such a manner that each hole 30 farthest from the side of the above end (right side in FIG. 9) had its center at a position separated by 0.28 W from the end of the laminate 7 which end was located on the side of the above end, where W represents the width of the separation membrane in the laminated state, that is, the width of the laminate 7 (214 mm).

A spiral-wound acid gas separation membrane element was produced by the above-described method for producing a spiral-wound acid gas separation membrane element (production process) (see the description above).

The permeate-side channel component was bonded to the core tube with use of a two-liquid-mixture type epoxy adhesive (viscosity: 45,000 cP). A glass fiber impregnated with a two-liquid-mixture type epoxy adhesive (viscosity: 5,000 cP) was used as a reinforcement member for the outer periphery of the spiral-wound acid gas separation membrane element.

The spiral-wound acid gas separation membrane element produced had a diameter of 2 inches (51 mm) and a length of 10 inches (254 mm). The above-described gas leakage test was conducted on the spiral-wound acid gas separation membrane element produced, and confirmed that the spiral-wound acid gas separation membrane element was gas tight.

The amount of $CO_2$ separated by the spiral-wound acid gas separation membrane element was measured, and was compared with the amount of $CO_2$ separated by the spiral-wound acid gas separation membrane element of each of Examples 4 through 6. The flow rate of mixed gas was set at 0.1 $Nm^3/hr \cdot m^2$. Table 3 comprehensively shows (i) the structure of the group of holes on the core tube and the partition(s) in the permeate-side spatial portion and (ii) the amount of separated $CO_2$, for the spiral-wound acid gas separation membrane element of Example 3.

[Example 4] Spiral-Wound Acid Gas Separation Membrane Element with a Partition(s)

Figure 10:
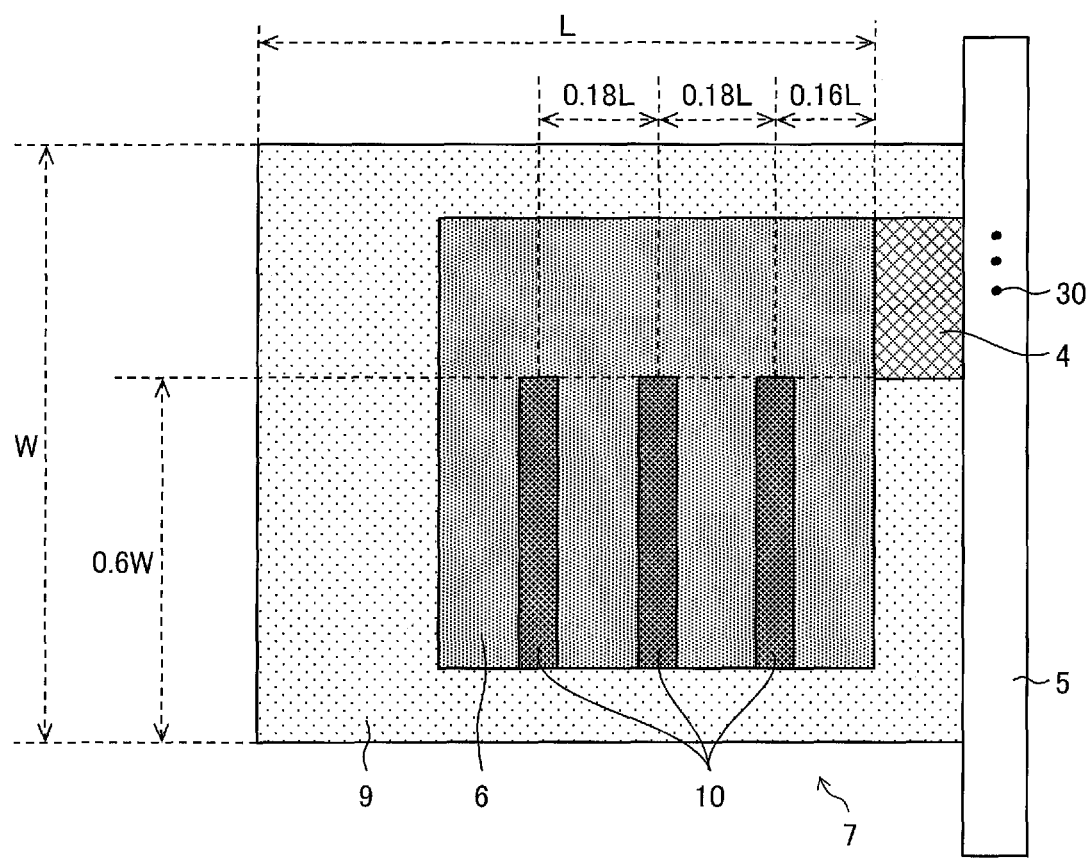
FIG. 10 is an elevational view schematically illustrating a structure as developed of a wound body in a spiral-wound acid gas separation membrane element of Example 4.

A spiral-wound acid gas separation membrane element was produced as in Example 3 except that the spiral-wound acid gas separation membrane element included three partitions 10 in a permeate-side spatial portion defined by the permeate-side channel component 4 as illustrated in FIG. 10. The partitions 10 were formed with use of the same adhesive as that for forming an adhesion section for a membrane leaf (that is, a two-liquid-mixture type epoxy adhesive [viscosity: 45,000 cP]).

The partitions 10 were long enough to reach a position separated by 0.6 W from the side of the end of the laminate 7 (lower side in FIG. 10) which end was located on the upstream side of the path in which mixed gas would flow (direction from below to above in FIG. 10), where W represents the width of the separation membrane in the laminated state, that is, the width of the laminate 7. The partitions 10 were parallel with the core tube 5 to have respective positions (center lines) separated by 0.16 L, 0.34 L (0.16 L+0.18 L), and 0.52 L (0.16 L+0.18 L+0.18 L) respectively from the core tube 5, where L represents the length of the separation membrane in the laminated state, that is, the length of the laminate 7 (excluding a portion that allows only the permeate-side channel component 4 to be wound around the core tube 5). The partitions 10 each had a width of 13 mm.

The amount of $CO_2$ separated by the spiral-wound acid gas separation membrane element was measured, and was compared with the amount of $CO_2$ separated by the spiral-wound acid gas separation membrane element of Example 3. The flow rate of mixed gas was set at 0.1 $Nm^3/hr \cdot m^2$. The comparison showed that with the index of 100 for the amount of $CO_2$ separated by the spiral-wound acid gas separation membrane element of Example 3, the amount of $CO_2$ separated by the above-produced spiral-wound acid gas separation membrane element was 113. This demonstrated that the efficiency of $CO_2$ separation is increased by forming a partition(s) in a spatial portion defined by the permeate-side channel component. Table 3 comprehensively shows (i) the structure of the group of holes on the core tube and the partition(s) in the permeate-side spatial portion and (ii) the amount of separated $CO_2$, for the spiral-wound acid gas separation membrane element of Example 4.

Example 5

Figure 11:
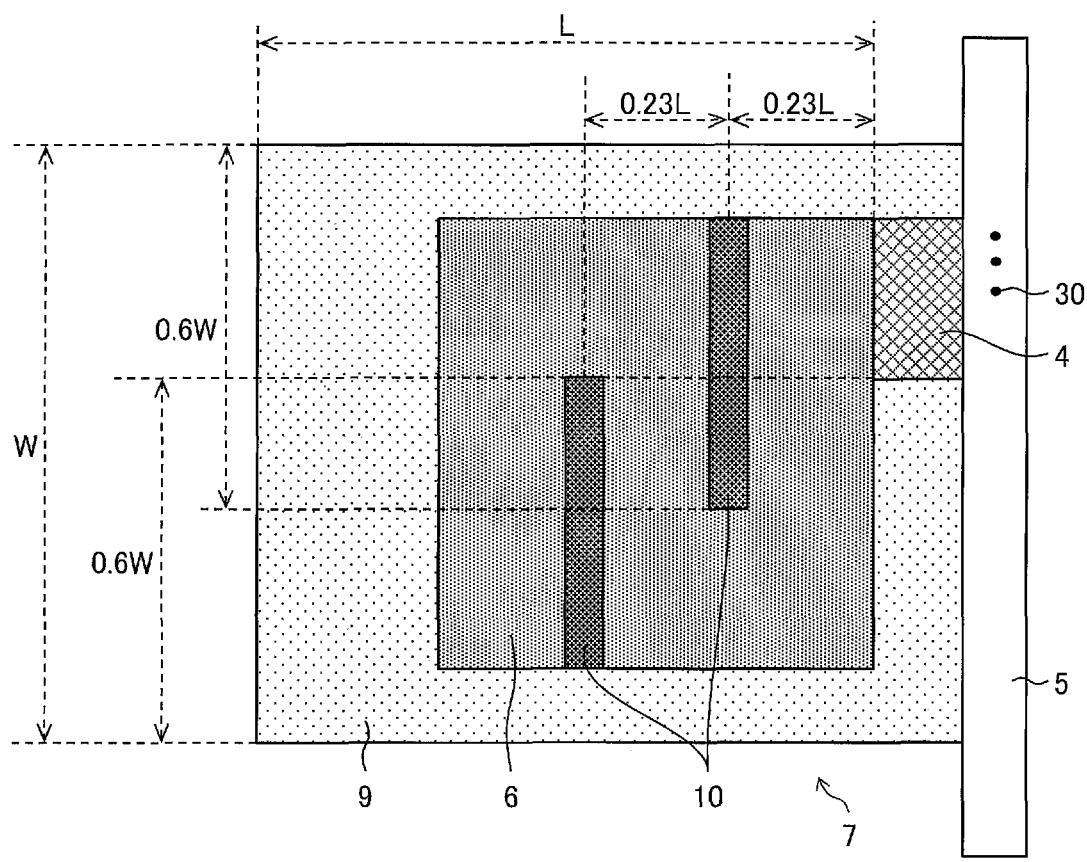
FIG. 11 is an elevational view schematically illustrating a structure as developed of a wound body in a spiral-wound acid gas separation membrane element of Example 5.

A spiral-wound acid gas separation membrane element was produced as in Example 3 except that the spiral-wound acid gas separation membrane element included two partitions in a permeate-side spatial portion defined by the permeate-side channel component 4 as illustrated in FIG. 11.

The partitions 10 were formed with use of the same adhesive as that for forming an adhesion section for a membrane leaf (that is, a two-liquid-mixture type epoxy adhesive [viscosity: 45,000 cP]).

The partitions 10 had respective lengths in such a manner that (i) the partition 10 close to the core tube 5 reached a position separated by 0.6 W from the side of the end (upper side in FIG. 11) of the laminate 7 which end was located on the downstream side of the path in which mixed gas would flow (direction from below to above in FIG. 11) and that (ii) the partition 10 far from the core tube 5 reached a position separated by 0.6 W from the side of the end of the laminate 7 (lower side in FIG. 11) which end was located on the upstream side of the channel space of mixed gas, where W represents the width of the separation membrane in the laminated state, that is, the width of the laminate 7. The partitions 10 were parallel with the core tube 5 to have respective positions (center lines) in such a manner that (i) the partition 10 close to the core tube 5 had a center line separated by 0.23 L from the core tube 5 and that (ii) the partition 10 far from the core tube 5 had a center line separated by 0.46 L (0.23 L+0.23 L) from the core tube 5, where L represents the length of the separation membrane in the laminated state, that is, the length of the laminate 7 (excluding a portion that allows only the permeate-side channel component 4 to be wound around the core tube 5). The partitions 10 each had a width of 13 mm.

The amount of $CO_2$ separated by the spiral-wound acid gas separation membrane element was measured, and was compared with the amount of $CO_2$ separated by the spiral-wound acid gas separation membrane element of Example 3. The flow rate of mixed gas was set at 0.1 $Nm^3/hr \cdot m^2$. The comparison showed that with the index of 100 for the amount of $CO_2$ separated by the spiral-wound acid gas separation membrane element of Example 3, the amount of $CO_2$ separated by the above-produced spiral-wound acid gas separation membrane element was 111. This demonstrated that the efficiency of $CO_2$ separation is increased by forming a partition(s) in a spatial portion defined by the permeate-side channel component. Table 3 comprehensively shows (i) the structure of the group of holes on the core tube and the partition(s) in the permeate-side spatial portion and (ii) the amount of separated $CO_2$, for the spiral-wound acid gas separation membrane element of Example 5.

Example 6

Figure 12:
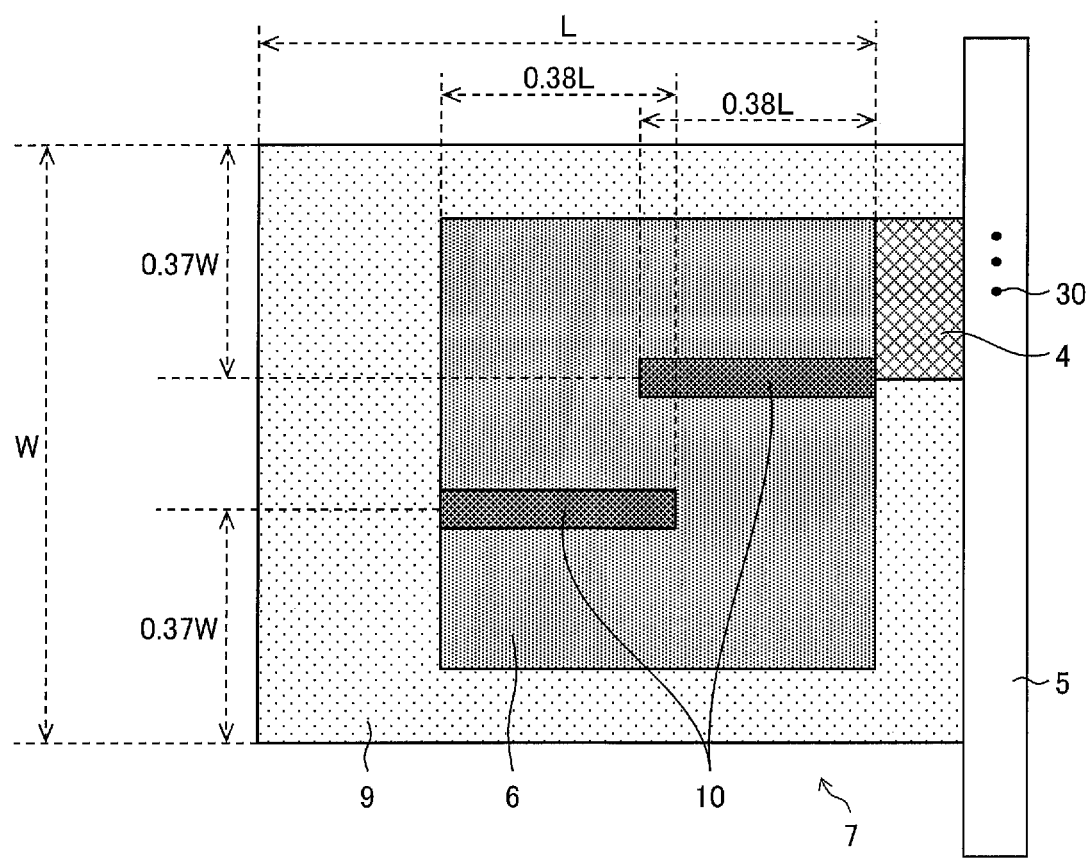
FIG. 12 is an elevational view schematically illustrating a structure as developed of a wound body in a spiral-wound acid gas separation membrane element of Example 6.

A spiral-wound acid gas separation membrane element was produced as in Example 3 except that the spiral-wound acid gas separation membrane element included two partitions 10 in a permeate-side spatial portion defined by the permeate-side channel component 4 as illustrated in FIG. 12. The partitions 10 were formed with use of the same adhesive as that for forming an adhesion section for a membrane leaf (that is, a two-liquid-mixture type epoxy adhesive [viscosity: 45,000 cP]).

The partitions 10 had respective lengths in such a manner that (i) the partition 10 close to the core tube 5 reached a position separated by 0.38 L from the end of the laminate 7 (excluding a portion that allows only the permeate-side channel component 4 to be wound around the core tube 5) which end was close to the core tube 5 and that (ii) the partition 10 far from the core tube 5 reached a position separated by 0.38 L from the lengthwise end of the laminate 7 excluding the adhesion section 9 (0.67 L from the lengthwise end of the laminate 7), where L represents the length of the separation membrane in the laminated state, that is, the length of the laminate 7 (excluding a portion that allows only the permeate-side channel component 4 to be wound around the core tube 5). The partitions 10 were orthogonal to the core tube 5 to have respective positions (center lines) in such a manner that (i) the partition 10 close to the core tube 5 had a center line separated by 0.37 W from the side of the end (upper side in FIG. 12) of the laminate 7 which end was located on the downstream side of the path in which mixed gas would flow and that (ii) the partition 10 far from the core tube 5 had a center line separated by 0.37 W from the side of the end of the laminate 7 (lower side in FIG. 12) which end was located on the upstream side of the path in which mixed gas would flow, where W represents the width of the separation membrane in the laminated state, that is, the width of the laminate 7. The partitions 10 each had a width of 13 mm.

The amount of $CO_2$ separated by the spiral-wound acid gas separation membrane element was measured, and was compared with the amount of $CO_2$ separated by the spiral-wound acid gas separation membrane element of Example 3. The flow rate of mixed gas was set at 0.1 $Nm^3/hr \cdot m^2$. The comparison showed that with the index of 100 for the amount of $CO_2$ separated by the spiral-wound acid gas separation membrane element of Example 3, the amount of $CO_2$ separated by the above-produced spiral-wound acid gas separation membrane element was 167. This demonstrated that the efficiency of $CO_2$ separation is increased by forming a partition(s) in a spatial portion defined by the permeate-side channel component. Table 3 comprehensively shows (i) the structure of the group of holes on the core tube and the partition(s) in the permeate-side spatial portion and (ii) the amount of separated $CO_2$, for the spiral-wound acid gas separation membrane element of Example 6.

TABLE 1

Results of measurements of the amount of $CO_2$ separated for a case where no partition is formed in a spatial portion defined by a permeate-side channel component (No. 1)

| | Group of holes on core tube | Partition in permeate-side spatial portion | Flow rate of mixed gas [$Nm^3/hr$] | Relative value of amount of $CO_2$ separated [%] |
|---|---|---|---|---|
| Example 1 | Locally present | None | 4.5 | 105 |
| Comparative Example 1 | All over | None | 4.5 | 100 |

TABLE 2

Results of measurements of the amount of $CO_2$ separated for a case where no partition is formed in a spatial portion defined by a permeate-side channel component (No. 2)

| | Group of holes on core tube | Partition in permeate-side spatial portion | Flow rate of mixed gas [$Nm^3/hr$] | Relative value of amount of $CO_2$ separated [%] |
|---|---|---|---|---|
| Example 2 | Locally present | None | 0.3 | 131 |
| Comparative Example 2 | All over | None | 0.3 | 100 |

TABLE 3

Results of measurements of the amount of $CO_2$ separated for a case where a partition(s) is formed in a spatial portion defined by a permeate-side channel component

|  | Group of holes on core tube | Partition in permeate-side spatial portion | Relative value of amount of $CO_2$ separated [%] |
|---|---|---|---|
| Example 3 | Locally present | None | 100 |
| Example 4 | Locally present | Comb shape (2) | 113 |
| Example 5 | Locally present | N shape | 111 |
| Example 6 | Locally present | S shape | 167 |

INDUSTRIAL APPLICABILITY

A spiral-wound acid gas separation membrane element, an acid gas separation membrane module, and an acid gas separation apparatus of the present invention can separate acid gas from mixed gas including at least acid gas and water vapor more efficiently than conventional, and can also save energy. The present invention is therefore widely applicable in a process of separating acid gas such as $CO_2$ from such mixed gas including at least acid gas and water vapor as (i) synthesis gas synthesized in a large-scale plant that produces, for example, hydrogen and/or urea, (ii) natural gas, and (iii) exhaust gas.

REFERENCE SIGNS LIST

1 Spiral-wound acid gas separation membrane element
2 Separation membrane
3 Feed-side channel component
4 Permeate-side channel component
5 Core tube
6 Membrane leaf
7 Laminate
9 Adhesion section
10 Partition
15 Housing
30 Hole
M Acid gas separation membrane module

The invention claimed is:

1. A spiral-wound acid gas separation membrane element comprising:
a wound body including:
a separation membrane;
a feed-side channel component;
a permeate-side channel component; and
a core tube,
the separation membrane including:
a separate functional layer including:
an acid gas carrier that reversibly reacts with acid gas; and
an acid gas separation membrane resin; and
a support layer including a porous membrane,
the separation membrane, the feed-side channel component, and the permeate-side channel component being wound in a laminated state around the core tube,
the core tube having a group of holes for allowing communication between a permeate-side spatial portion defined by the permeate-side channel component and a spatial portion inside the core tube,
the group of holes being present on an end side of the core tube, and
wherein
the group of holes are positioned not less than 0.05×W and not more than 0.4×W away from a widthwise end of the separation membrane in the laminated state which end is located on the end side, where W represents a width of the separation membrane in the laminated state, and the group of holes are present only in a region not less than 0.05×W and not more than 0.4×W away from the widthwise end of the separation membrane in the laminated state which end is located on the end side, and the group of holes are absent in regions other than the region not less than 0.05×W and not more than 0.4×W away from the widthwise end of the separation membrane in the laminated state which end is located on the end side.

2. The spiral-wound acid gas separation membrane element according to claim 1, further comprising:
a partition in the permeate-side spatial portion which partition is configured to guide a flow of permeation gas, which has permeated through the separation membrane.

3. The spiral-wound acid gas separation membrane element according to claim 2,
wherein
the partition is made of an epoxy adhesive resin and is provided in a belt-like shape.

4. An acid gas separation membrane module comprising:
at least one spiral-wound acid gas separation membrane element according to claim 1; and
a housing,
the at least one spiral-wound acid gas separation membrane element being contained in the housing.

5. The acid gas separation membrane module according to claim 4,
wherein:
the acid gas separation membrane module includes two acid gas separation membrane elements in the housing; and
the housing has three openings each for entry or exit of mixed gas.

6. A method of using a spiral-wound acid gas separation membrane element according to claim 1,
the spiral-wound acid gas separation membrane element being installed in a housing in such a manner that an end of the core tube on which end the group of holes are present is located on a downstream side of a path in which mixed gas flows through a spatial portion defined by the feed-side channel component.

* * * * *